(12) United States Patent
Halliwell

(10) Patent No.: US 11,598,490 B2
(45) Date of Patent: *Mar. 7, 2023

(54) LIGHT EMITTING DIODE (LED) LIGHTING DEVICE OR LAMP WITH CONFIGURABLE LIGHT QUALITIES

(71) Applicant: Feit Electric Company, Inc., Pico Rivera, CA (US)

(72) Inventor: Brian Halliwell, Pico Rivera, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,767

(22) Filed: Dec. 28, 2021

(65) Prior Publication Data

US 2022/0120386 A1    Apr. 21, 2022

Related U.S. Application Data

(63) Continuation of application No. 17/126,882, filed on Dec. 18, 2020, now Pat. No. 11,242,958, which is a
(Continued)

(51) Int. Cl.
*F21K 9/232* (2016.01)
*H05B 45/20* (2020.01)
*H05B 47/19* (2020.01)
*F21V 29/70* (2015.01)
*F21K 9/238* (2016.01)
(Continued)

(52) U.S. Cl.
CPC .............. *F21K 9/232* (2016.08); *F21K 9/235* (2016.08); *F21K 9/237* (2016.08); *F21K 9/238* (2016.08);
(Continued)

(58) Field of Classification Search
CPC ........ H05B 45/10; H05B 45/14; H05B 45/18; H05B 45/20; H05B 45/24; H05B 45/28;
(Continued)

(56) References Cited

U.S. PATENT DOCUMENTS 6,127,783 A    10/2000  Pashley et al.
6,149,283 A    11/2000  Conway et al.
(Continued)

FOREIGN PATENT DOCUMENTS

CN    201844227 U    5/2011
CN    204069421 U    12/2014
(Continued)

OTHER PUBLICATIONS

Canadian Intellectual Property Office, Canadian Office Action for Canadian Patent Application No. 3,021,693, dated Jul. 26, 2019 (6 pages), Quebec, Canada.
(Continued)

*Primary Examiner* — Jason Crawford
(74) *Attorney, Agent, or Firm* — Alston & Bird LLP

(57) ABSTRACT

An LED lighting device or LED lamp comprises one or more LED packages, and a switch comprising at least two selectable positions. At least one selectable position corresponds to a set operating mode and one selectable position corresponds to a configurable operating mode. When the switch is in the selectable position corresponding to the set operating mode, responsive to receiving an indication of user input for selecting user-selected operating light qualities, the one or more LED packages continue to be operated in accordance with the predefined operating light qualities corresponding to the set operating mode. When the switch is in the selectable position corresponding to the configurable operating mode, responsive to receiving an indication of user input for selecting user-selected operating light qualities, operation of the one or more LED packages is modified in accordance with the user-selected operating light qualities.

20 Claims, 12 Drawing Sheets

Related U.S. Application Data continuation of application No. 16/545,873, filed on Aug. 20, 2019, now Pat. No. 10,904,969, which is a continuation of application No. 16/128,162, filed on Sep. 11, 2018, now Pat. No. 10,433,390, which is a continuation of application No. 15/705,808, filed on Sep. 15, 2017, now Pat. No. 10,104,742, which is a continuation of application No. 15/274,575, filed on Sep. 23, 2016, now Pat. No. 9,801,250.

(51) Int. Cl.

| | | |
|---|---|---|
| *F21K 9/65* | (2016.01) | |
| *F21K 9/235* | (2016.01) | |
| *F21K 9/237* | (2016.01) | |
| *F21V 3/00* | (2015.01) | |
| *F21V 19/00* | (2006.01) | |
| *F21V 23/00* | (2015.01) | |
| *F21V 23/04* | (2006.01) | |
| *H05B 39/08* | (2006.01) | |
| *F21S 8/02* | (2006.01) | |
| *F21Y 113/13* | (2016.01) | |
| *F21Y 115/10* | (2016.01) | |

(52) U.S. Cl.
CPC ............... *F21K 9/65* (2016.08); *F21V 3/00* (2013.01); *F21V 19/006* (2013.01); *F21V 23/003* (2013.01); *F21V 23/04* (2013.01); *F21V 29/70* (2015.01); *H05B 45/20* (2020.01); *H05B 47/19* (2020.01); *F21S 8/02* (2013.01); *F21Y 2113/13* (2016.08); *F21Y 2115/10* (2016.08); *H05B 39/088* (2013.01); *Y02B 20/30* (2013.01)

(58) Field of Classification Search
CPC ...... H05B 45/30; H05B 47/01; H05B 47/105; H05B 47/11; H05B 47/14; H05B 47/155; H05B 47/17; H05B 47/19; F21V 23/003; F21V 23/04; Y02B 20/30
See application file for complete search history.

(56) References Cited

U.S. PATENT DOCUMENTS

| | | | |
|---|---|---|---|
| 6,201,351 B1 | 3/2001 | Rudolph et al. | |
| 6,357,889 B1 | 3/2002 | Duggal et al. | |
| 6,781,329 B2 | 8/2004 | Mueller et al. | |
| 6,834,981 B2 | 12/2004 | Nagai et al. | |
| 7,014,336 B1 | 3/2006 | Ducharme et al. | |
| 7,083,293 B2 | 8/2006 | Kalinski | |
| 7,201,489 B2 | 4/2007 | Shyu | |
| 7,255,457 B2 | 8/2007 | Ducharme et al. | |
| 7,288,902 B1 | 10/2007 | Melanson | |
| 7,405,715 B2 | 7/2008 | Guzman et al. | |
| 7,416,312 B1 | 8/2008 | McDermott | |
| 7,484,860 B2 * | 2/2009 | Demarest ................ F21K 9/232 |
| | | | 362/253 |
| 7,520,634 B2 | 4/2009 | Ducharme et al. | |
| 7,521,667 B2 | 4/2009 | Rains, Jr. et al. | |
| 7,659,674 B2 | 2/2010 | Mueller et al. | |
| 7,883,239 B2 | 2/2011 | Rains, Jr. et al. | |
| 7,926,300 B2 | 4/2011 | Roberts et al. | |
| 7,988,327 B1 | 8/2011 | Knoble et al. | |
| 8,044,608 B2 | 10/2011 | Kuo et al. | |
| 8,076,867 B2 | 12/2011 | Kuo et al. | |
| 8,111,017 B2 | 2/2012 | Lin et al. | |
| 8,159,125 B2 | 4/2012 | Miao | |
| 8,172,415 B2 | 5/2012 | Wegh et al. | |
| 8,207,821 B2 | 6/2012 | Roberge et al. | |
| 8,220,970 B1 | 7/2012 | Khazi et al. | |
| 8,305,013 B2 | 11/2012 | Lin et al. | |
| 8,314,571 B2 | 11/2012 | Jonsson | |
| 8,317,362 B2 | 11/2012 | Ku et al. | |
| 8,330,388 B2 | 12/2012 | Kuo et al. | |
| 8,339,063 B2 | 12/2012 | Yan et al. | |
| 8,339,067 B2 | 12/2012 | Lin et al. | |
| 8,378,588 B2 | 2/2013 | Kuo et al. | |
| 8,378,589 B2 | 2/2013 | Kuo et al. | |
| 8,430,402 B2 | 4/2013 | Diehl et al. | |
| 8,482,219 B2 | 7/2013 | Kuo et al. | |
| 8,508,150 B2 | 8/2013 | Kuo et al. | |
| 8,598,793 B2 | 12/2013 | Yan et al. | |
| 8,664,895 B2 | 3/2014 | Yan et al. | |
| 8,669,722 B2 | 3/2014 | Yeh et al. | |
| 8,729,812 B2 | 5/2014 | Kuwu | |
| 8,853,950 B1 * | 10/2014 | Chang ................... H05B 47/10 |
| | | | 315/307 |
| 8,872,438 B2 | 10/2014 | Zhou et al. | |
| 8,884,508 B2 | 11/2014 | Pickard et al. | |
| 8,890,440 B2 | 11/2014 | Yan et al. | |
| 8,941,312 B2 | 1/2015 | McRae | |
| 8,947,013 B2 | 2/2015 | Sutardja et al. | |
| 9,030,122 B2 | 5/2015 | Yan et al. | |
| 9,072,148 B2 | 6/2015 | Tanaka et al. | |
| 9,119,252 B2 | 8/2015 | Wu | |
| 9,144,129 B2 | 9/2015 | Munday | |
| 9,232,591 B2 | 1/2016 | Kuo et al. | |
| 9,232,602 B2 | 1/2016 | Yeh et al. | |
| 9,253,843 B2 | 2/2016 | Lee et al. | |
| 9,386,653 B2 | 7/2016 | Kuo et al. | |
| 9,441,801 B1 | 9/2016 | Myers et al. | |
| 9,642,208 B2 | 5/2017 | Van De Ven | |
| 9,713,211 B2 * | 7/2017 | van de Ven ............ H05B 45/10 |
| 9,730,291 B1 | 8/2017 | Janik et al. | |
| 9,781,793 B2 | 10/2017 | Yan et al. | |
| 9,786,639 B2 | 10/2017 | Bergmann et al. | |
| 9,799,125 B1 | 10/2017 | Wegner et al. | |
| 9,801,250 B1 * | 10/2017 | Halliwell ................ F21V 29/70 |
| 9,820,350 B2 | 11/2017 | Pyshos et al. | |
| 9,892,693 B1 | 2/2018 | Kumar et al. | |
| 9,900,945 B1 | 2/2018 | Janik et al. | |
| 9,909,723 B2 | 3/2018 | Bergmann et al. | |
| 9,924,582 B2 | 3/2018 | Vendetti et al. | |
| 9,974,138 B2 | 5/2018 | Allen et al. | |
| 10,008,484 B2 | 6/2018 | Bergmann et al. | |
| 10,009,971 B2 | 6/2018 | Chobot et al. | |
| 10,018,346 B2 | 7/2018 | Van De Ven et al. | |
| 10,076,011 B1 | 9/2018 | Amidi et al. | |
| 10,091,855 B2 | 10/2018 | Van Winkle | |
| 10,104,742 B2 * | 10/2018 | Halliwell ............... H05B 45/20 |
| 10,117,300 B2 | 10/2018 | Doheny et al. | |
| 10,136,503 B2 | 11/2018 | Chen | |
| 10,163,405 B2 | 12/2018 | Kumar et al. | |
| 10,231,300 B2 | 3/2019 | Cash et al. | |
| 10,278,250 B2 | 4/2019 | Mcbryde et al. | |
| 10,290,265 B2 | 5/2019 | Kumar et al. | |
| 10,292,233 B1 | 5/2019 | Udavant et al. | |
| 10,299,335 B2 | 5/2019 | Pyshos et al. | |
| 10,299,336 B2 | 5/2019 | Bowen et al. | |
| 10,334,678 B2 | 6/2019 | Janik et al. | |
| 10,433,390 B2 * | 10/2019 | Halliwell ................ F21K 9/232 |
| 10,462,871 B2 | 10/2019 | Van Winkle | |
| 10,492,262 B2 | 11/2019 | Van Winkle | |
| 10,602,584 B2 | 3/2020 | Pyshos et al. | |
| 10,683,969 B2 | 6/2020 | Jeswani et al. | |
| 10,718,474 B1 * | 7/2020 | Von Fange ............. F21V 5/045 |
| 10,893,587 B2 * | 1/2021 | Halliwell ................ F21K 9/235 |
| 10,904,969 B2 * | 1/2021 | Halliwell ................ H05B 47/19 |
| 11,147,136 B1 | 10/2021 | Igo et al. | |
| 11,242,958 B2 * | 2/2022 | Halliwell ................ F21K 9/232 |
| 11,248,752 B2 | 2/2022 | Halliwell | |
| 2002/0048169 A1 * | 4/2002 | Dowling ............... H05B 47/155 |
| | | | 372/38.1 |
| 2002/0071279 A1 * | 6/2002 | Katogi ................... H05B 45/20 |
| | | | 362/317 |
| 2002/0195975 A1 * | 12/2002 | Schanberger ........... G09G 3/14 |
| | | | 315/312 |
| 2004/0264187 A1 * | 12/2004 | Vanderschuit ......... H01R 33/94 |
| | | | 362/235 |
| 2005/0012457 A1 | 1/2005 | Wu | |
| 2005/0077837 A1 | 4/2005 | Kim et al. | |

(56) References Cited

U.S. PATENT DOCUMENTS

| | | | |
|---|---|---|---|
| 2005/0128751 A1* | 6/2005 | Roberge | H05B 45/325 362/276 |
| 2005/0270780 A1* | 12/2005 | Zhang | F21V 3/00 362/257 |
| 2005/0285547 A1* | 12/2005 | Piepgras | H05B 45/20 315/294 |
| 2006/0220586 A1 | 10/2006 | Latham | |
| 2006/0237636 A1 | 10/2006 | Lyons et al. | |
| 2006/0238136 A1* | 10/2006 | Johnson, III | F21K 9/232 315/185 R |
| 2007/0247840 A1* | 10/2007 | Ham | F21K 9/23 362/227 |
| 2007/0273290 A1 | 11/2007 | Ashdown et al. | |
| 2008/0060917 A1 | 3/2008 | Chen et al. | |
| 2008/0106893 A1* | 5/2008 | Johnson | H05B 45/00 362/228 |
| 2009/0052170 A1* | 2/2009 | Jeng | F21S 2/005 362/233 |
| 2010/0237798 A1 | 9/2010 | Wolf et al. | |
| 2010/0328946 A1* | 12/2010 | Borkar | F21K 9/233 362/249.02 |
| 2011/0193479 A1* | 8/2011 | Nilssen | F21V 29/74 315/32 |
| 2012/0306377 A1 | 12/2012 | Igaki et al. | |
| 2012/0327660 A1* | 12/2012 | Lin | F21K 9/232 362/253 |
| 2013/0003417 A1* | 1/2013 | Chien | F21V 23/0407 362/646 |
| 2013/0038244 A1* | 2/2013 | Kamii | H05B 45/20 315/297 |
| 2013/0114241 A1 | 5/2013 | Van De Ven et al. | |
| 2013/0147359 A1* | 6/2013 | Chobot | H05B 45/20 315/122 |
| 2013/0154510 A1* | 6/2013 | Sutardja | H05B 45/35 315/297 |
| 2013/0201668 A1* | 8/2013 | Chien | F21S 9/02 362/183 |
| 2013/0270999 A1 | 10/2013 | Ramer et al. | |
| 2013/0328503 A1 | 12/2013 | Toda | |
| 2014/0049972 A1* | 2/2014 | McGuire | F21K 9/23 362/427 |
| 2014/0070700 A1 | 3/2014 | Genthon et al. | |
| 2014/0184080 A1* | 7/2014 | Rybicki | H01L 27/0248 315/122 |
| 2014/0210357 A1 | 7/2014 | Yan et al. | |
| 2014/0210376 A1 | 7/2014 | Hicks, IV | |
| 2014/0239811 A1* | 8/2014 | Kreiner | F21K 9/232 315/86 |
| 2014/0264406 A1 | 9/2014 | Muehlbacher et al. | |
| 2014/0361696 A1* | 12/2014 | Siessegger | H05B 45/395 315/193 |
| 2014/0364219 A1 | 12/2014 | Matsushita et al. | |
| 2015/0029712 A1 | 1/2015 | Nakamura et al. | |
| 2015/0035454 A1* | 2/2015 | Chang | H05B 47/185 315/307 |
| 2015/0048758 A1 | 2/2015 | Carrigan et al. | |
| 2015/0054410 A1 | 2/2015 | Sanders et al. | |
| 2015/0070897 A1* | 3/2015 | Chien | F21V 14/02 362/269 |
| 2015/0084513 A1* | 3/2015 | Anthony | H05B 47/175 315/131 |
| 2015/0276204 A1* | 10/2015 | Ray | F21V 31/005 239/20 |
| 2015/0296577 A1 | 10/2015 | Chen | |
| 2016/0286633 A1 | 9/2016 | Juslen | |
| 2016/0295658 A1 | 10/2016 | Chraibi et al. | |
| 2016/0316527 A1 | 10/2016 | Allen et al. | |
| 2017/0019973 A1 | 1/2017 | Beck et al. | |
| 2017/0080849 A1 | 3/2017 | Nogha et al. | |
| 2017/0086265 A1 | 3/2017 | Akiyama et al. | |
| 2017/0105265 A1 | 4/2017 | Sadwick | |
| 2017/0167705 A1* | 6/2017 | Jacobson | H05B 47/105 |
| 2017/0181241 A1 | 6/2017 | Koo | |
| 2017/0227174 A1 | 8/2017 | May | |
| 2017/0303363 A1 | 10/2017 | Pyshos et al. | |
| 2017/0354022 A1 | 12/2017 | Dimberg et al. | |
| 2018/0092183 A1* | 3/2018 | Halliwell | H05B 45/20 |
| 2018/0206305 A1 | 7/2018 | Van Winkle | |
| 2018/0227991 A1* | 8/2018 | Hegde | F21V 23/005 |
| 2018/0288847 A1* | 10/2018 | Halliwell | H05B 45/10 |
| 2018/0310383 A1 | 10/2018 | Joergensen | |
| 2018/0311386 A1 | 11/2018 | Hawkins et al. | |
| 2019/0037661 A1* | 1/2019 | Halliwell | F21V 19/006 |
| 2019/0373701 A1* | 12/2019 | Halliwell | H05B 47/19 |
| 2021/0105877 A1* | 4/2021 | Halliwell | F21K 9/238 |
| 2021/0180780 A1 | 6/2021 | Stolte et al. | |
| 2021/0282249 A1* | 9/2021 | Huang | H05B 47/19 |
| 2022/0128200 A1 | 1/2022 | Halliwell | |
| 2022/0120386 A1* | 4/2022 | Halliwell | H05B 47/19 |
| 2022/0167483 A1 | 5/2022 | Igo et al. | |

FOREIGN PATENT DOCUMENTS

| | | |
|---|---|---|
| CN | 105221949 A | 1/2016 |
| DE | 202011103835 U1 | 12/2011 |
| JP | 2013254666 A | 12/2013 |

OTHER PUBLICATIONS

Coolux, "Once Again Another Technology Breakthrough of LED Edgt-Lit Panel: The DIP-DIM Panel, 4 Wattage & 3 Color Switchable 130 LM/W", brochure distributed at LIGHTFAIR International 2016 Booth #1111, Apr. 26-28, 2016, 4 pages, San Diego, California.

Gisteq Corp., "GiSTEQ Flashmate F-160 & F-198," YouTube, https://www.youtube.com/watch?v=59Tf4CwF2oU, Aug. 8, 2013.

Hampton Bay, Use and Care Guide, LED Universal Ceiling Fan Light Kit, retrieved from https://images.homedepot-static.com/catalog/pdfImages/8f/8fbdd564-5722-4e5d-b579-e231a0848dd5.pdf on Jun. 12, 2020.

MSI Solid State Lighting, "Introducing PowerBand™ Variable Wattage Technology", retrieved from <https://www.1000bulbs.com/pdf/led-ipar3843101d-powerband.pdf> on Jan. 11, 2017, 1 page.

MSI Solid State Lighting, "iPAR™ 38 with Powerband Technology", retrieved from <https://www.1000bulbs.com/pdf/led-ipar3843101d-specs.pdf> on Jan. 11, 2017, 2 pages.

Philips Lighting, "Philips Lighting unveils SceneSwitch—a unique LED light bulb range designed to make multi-purpose homes work harder", Jul. 12, 2016, 6 pages, retrieved from <http://www.newsroom.lighting.philips.com/news/2016/20160712-philips-lighting-unveils-sceneswitch-a-unique-led-light-bulb-range-designed-to-make-multi-purpose-homes-work-harder.html> on Jan. 11, 2017.

United States Patent & Trademark Office, Notice of Allowance received for U.S. Appl. No. 16/001,260, dated Oct. 6, 2020, 15 pages, USA.

United States Patent & Trademark Office, Notice of Allowance received for U.S. Appl. No. 16/545,873, dated Oct. 16, 2020, 15 pages, USA.

United States Patent & Trademark Office, Office Action for U.S. Appl. No. 16/001,260, dated Jul. 13, 2020, 26 pages, USA.

United States Patent and Trademark Office, Advisory Action received for U.S. Appl. No. 16/545,873, dated May 20, 2020, 6 pages, US.

United States Patent and Trademark Office, Final Office Action for U.S. Appl. No. 16/001,260, dated Feb. 21, 2020, (17 pages), USA.

United States Patent and Trademark Office, Final Rejection received for U.S. Appl. No. 16/545,873, dated Jul. 27, 2020, 32 pages, US.

United States Patent and Trademark Office, Non Final Office Action for U.S. Appl. No. 16/001,260, dated Nov. 1, 2019, (17 pages), USA.

United States Patent and Trademark Office, NonFinal Office Action for U.S. Appl. No. 16/001,260, dated Jul. 29, 2019, (22 pages), USA.

United States Patent and Trademark Office, NonFinal Office Action for U.S. Appl. No. 16/545,873, dated Oct. 28, 2019, (26 pages), USA.

(56) References Cited

OTHER PUBLICATIONS

United States Patent and Trademark Office, Non-Final Office Action for U.S. Appl. No. 17/126,882, dated Aug. 11, 2021, 9 pages, USA.
United States Patent and Trademark Office, Notice of Allowance for U.S. Appl. No. 15/274,575, dated Aug. 28, 2017, 12 pages, U.S.
United States Patent and Trademark Office, Notice of Allowance for U.S. Appl. No. 15/705,808, dated Jun. 22, 2018, U.S.
United States Patent and Trademark Office, Notice of Allowance for U.S. Appl. No. 16/128,162, dated Jul. 3, 2019 (10 pages), U.S.
United States Patent and Trademark Office, Notice of Allowance for U.S. Appl. No. 17/126,882, dated Sep. 27, 2021, 10 pages, U.S.
United States Patent and Trademark Office, Office Action for U.S. Appl. No. 15/274,575, dated Apr. 24, 2017, 13 pages, U.S.
United States Patent and Trademark Office, Office Action for U.S. Appl. No. 15/705,808, dated Feb. 13, 2018, U.S.
United States Patent and Trademark Office, Office Action for U.S. Appl. No. 16/001,260, dated Aug. 10, 2018, 28 pages, USA.
United States Patent and Trademark Office, Office Action for U.S. Appl. No. 16/001,260, dated Dec. 20, 2018, 17 pages, USA.
Unknown Author, "Rambus introduces LED BR30 and PAR30 with mechanically adjustable CCT-LEDs", LEDs Magazine, Jun. 12, 2013, 3 pages, retrieved from <http://www.ledsmagazine.com/articles/iif/2013/06/rambus-introduces-led-br30-and-par30-with-mechanically-adjustable-cct.html> on Jan. 11, 2017.
"Ledy 33w 9.84 Inch 3630lm 5730 SMD Led Ceiling Light Fixtures Replacement Panel Retrofit Board Light Bulb Replace Incandescent Fluorescent Bulb Round Tube (White)", Mar. 17, 2016, pp. 1-6, retrieved from the Internet at <https://www.amazon.com/Ledy-Fixtures-Replacement-Incandescent-Fluorescent/dp/B01D3G1F3S?th=1> on Aug. 12, 2022.

\* cited by examiner

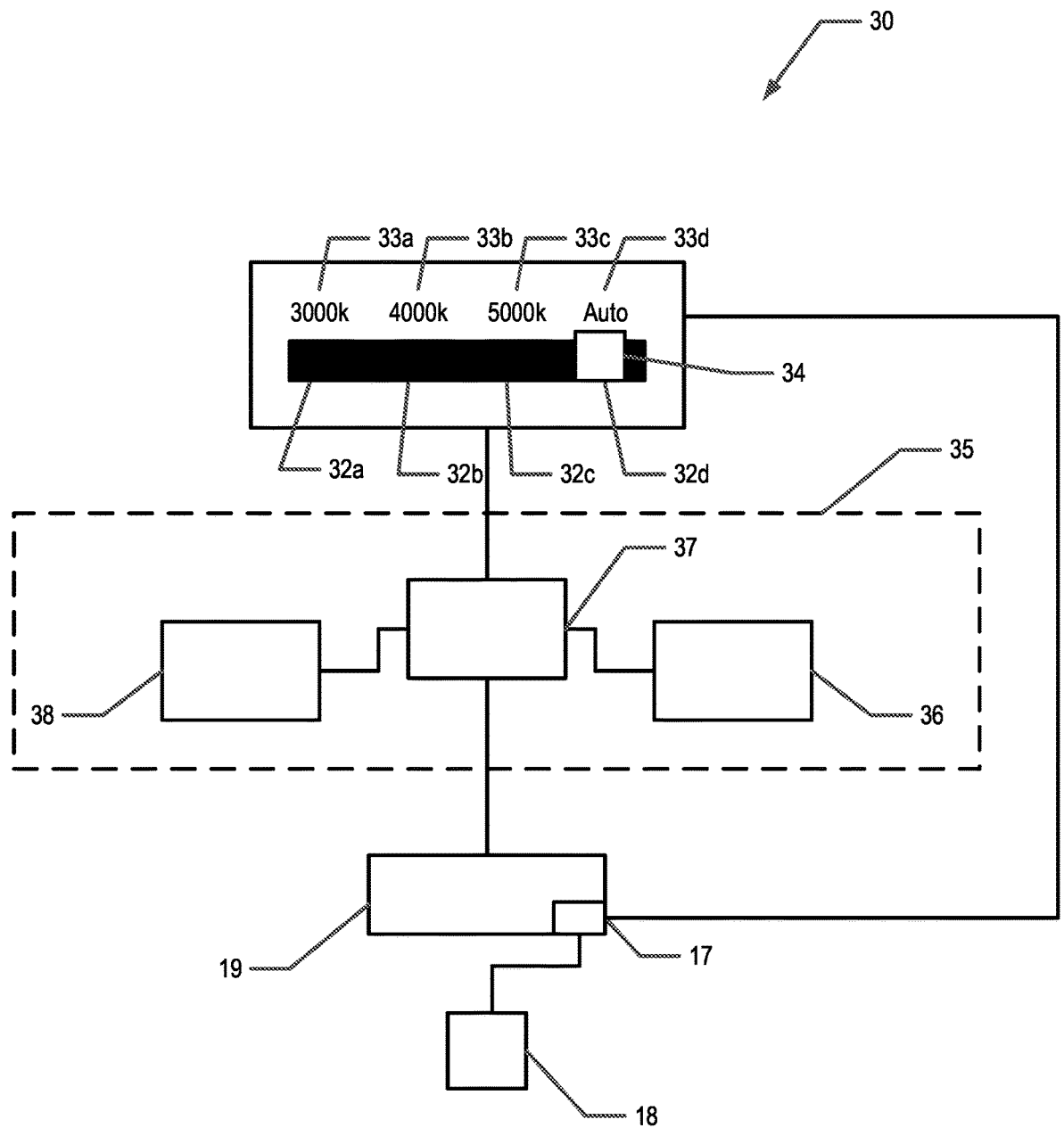

LIGHT EMITTING DIODE (LED) LIGHTING DEVICE OR LAMP WITH CONFIGURABLE LIGHT QUALITIES

CROSS-REFERENCE TO RELATED APPLICATIONS

This application is a continuation of U.S. application Ser. No. 17/126,882, filed Dec. 18, 2020, which application is also itself a continuation of U.S. application Ser. No. 16/545,873, filed Aug. 20, 2019 (now granted as U.S. Pat. No. 10,904,969), which application is also itself a continuation of U.S. application Ser. No. 16/128,162, filed Sep. 11, 2018 (now granted as U.S. Pat. No. 10,433,390), which application is also itself continuation of U.S. application Ser. No. 15/705,808, filed Sep. 15, 2017 (now granted as U.S. Pat. No. 10,104,742, as of Oct. 16, 2018), which application is also itself a continuation of U.S. application Ser. No. 15/274,575, filed Sep. 23, 2016 (now granted as U.S. Pat. No. 9,801,250, as of Oct. 24, 2017); the contents of all of which as are incorporated by reference herein in their entireties.

BACKGROUND

Incandescent bulbs are slowly being phased out in favor of more efficient lighting sources. This has led to an increased use of compact fluorescent bulbs which are more efficient than incandescent bulbs, but which tend to contain dangerous gasses, such as mercury. Compact fluorescent bulbs are also affected by ambient temperature and fail reach their peak brightness in colder conditions. Additionally, many people find the color temperature of light emitted by compact fluorescents to not be aesthetically pleasing for many applications, such as household lighting in kitchens, bathrooms, and living rooms; some commercial applications; and the like. Due to the nature of compact fluorescent bulbs, the bulbs always have a frosted appearance, which also tends to reduce the aesthetic appeal of compact fluorescent bulbs. The use of halogen bulbs has also increased; however due to the high temperatures at which halogen bulbs operate they are not highly efficient and may be a fire or burn hazard.

Recent advances in manufacturing light emitting diodes (LEDs) combined with the efficiency and long lifetime of LEDs have led to an increase in the availability and affordability of LED lamps and other LED lighting devices. LED lamps and lighting devices offer advantages over compact fluorescent bulbs including longer lifetime and the absence of dangerous gasses. Also, LED lamps and lighting devices may be configured to emit light at a wide variety of color temperatures.

Therefore, there is a need in the art for LED lighting devices that allow users to take advantage of the wide variety of color temperatures at which LEDs may emit light.

BRIEF SUMMARY

Embodiments of the present invention provide an LED lighting device or LED lamp for which one or more aspects of the light emitted from the LED lighting device or LED lamp (e.g., color temperature, brightness, color rendering index (CRI), and/or the like) is configurable and/or adjustable. For example, the LED lamp or LED lighting device may allow a user to select an operating mode (e.g., a programmable custom mode, a set mode, or a configurable mode). One or more qualities of the light (e.g., color temperature, brightness, CRI, and/or the like) emitted by the LED lamp or LED lighting device may then be controlled based on the user-selected operating mode. For example, a particular LED lamp or LED lighting device may be configured to emit light at a user-selected color temperature. For example, a user may set one or more light aspects or qualities (e.g., brightness, color temperature, CRI, and/or the like) at which the LED lighting device or LED lamp emits light at the time the LED lighting device or LED lamp is installed. Alternatively, the user may select to place the LED lighting device or LED lamp in a configurable operating mode. In the configurable operating mode, a user may use a remote switch (e.g., a wall switch, remote control, mobile computing device, and/or the like) to change the one or more operating light aspects or qualities at which the LED lighting device or LED lamp emits light during the operation of the LED lighting device or LED lamp. For example, the user may use a remote switch to toggle between preset operating light aspects or qualities.

According to one aspect of the present invention, an LED lighting device or LED lamp is provided. In example embodiments, the LED lighting device or LED lamp comprises one or more LED packages; driver circuitry configured to provide a controllable electrical current to at least one of the one or more LED packages during operation of the LED lighting device or LED lamp; a switch comprising at least two selectable options. At least one selectable option corresponds to a set operating mode and one selectable option corresponds to a configurable operating mode. The LED lighting device or LED lamp further comprises a user-selection switch for receiving user-selection of operating light qualities when the switch is in a position to select the configurable operating mode.

According to another aspect of the present invention, an LED lighting device or LED lamp is provided. In example embodiments, the LED lighting device or LED lamp comprises one or more LED packages; driver circuitry configured to provide a controllable electrical current to at least one of the one or more LED packages during operation of the LED lighting device or LED lamp; and a switch comprising at least two selectable options. At least one selectable option corresponds to a set operating mode and one selectable option corresponds to a configurable operating mode. When the LED lighting device or LED lamp is on and when the switch is in a position to select a selectable option corresponding to a set operating mode, the driver circuitry operates at least one of the one or more LED packages to emit light having set operating light qualities corresponding to the set operating mode. When the LED lighting device or LED lamp is on and when the switch is in a position to select the selectable option corresponding to the configurable operating mode, the driver circuitry operates at least one of the one or more LED packages to emit light having operating light qualities corresponding to a most recently received signal indicating a user-selection, the user-selection provided through user interaction with a wall or junction box mounted remote switch.

According to another aspect of the present invention, an LED lighting device or LED lamp is provided. In example embodiments, the LED lighting device or LED lamp comprises one or more LED packages; driver circuitry configured to provide a controllable electrical current to at least one of the one or more LED packages during operation of the LED lighting device or LED lamp; and a switch comprising at least two selectable options. At least one selectable option corresponds to a set operating mode and one selectable option corresponds to a configurable operating mode. When the LED lighting device or LED lamp is on and when the switch is in a position to select a selectable option corresponding to a set operating mode, the driver circuitry operates at least one of the one or more LED packages to emit light having set operating light qualities corresponding to the set operating mode. When the LED lighting device or LED lamp is on and when the switch is in a position to select the selectable option corresponding to the configurable operating mode, the driver circuitry operates at least one of the one or more LED packages to emit light having operating light qualities corresponding to a most recently received signal indicating a user-selection, the user-selection provided through user interaction with a portable remote switch.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a block diagram of at least some of the electrical components of an LED lamp or LED lighting device in accordance with example embodiments of the present invention;

Figure 7:
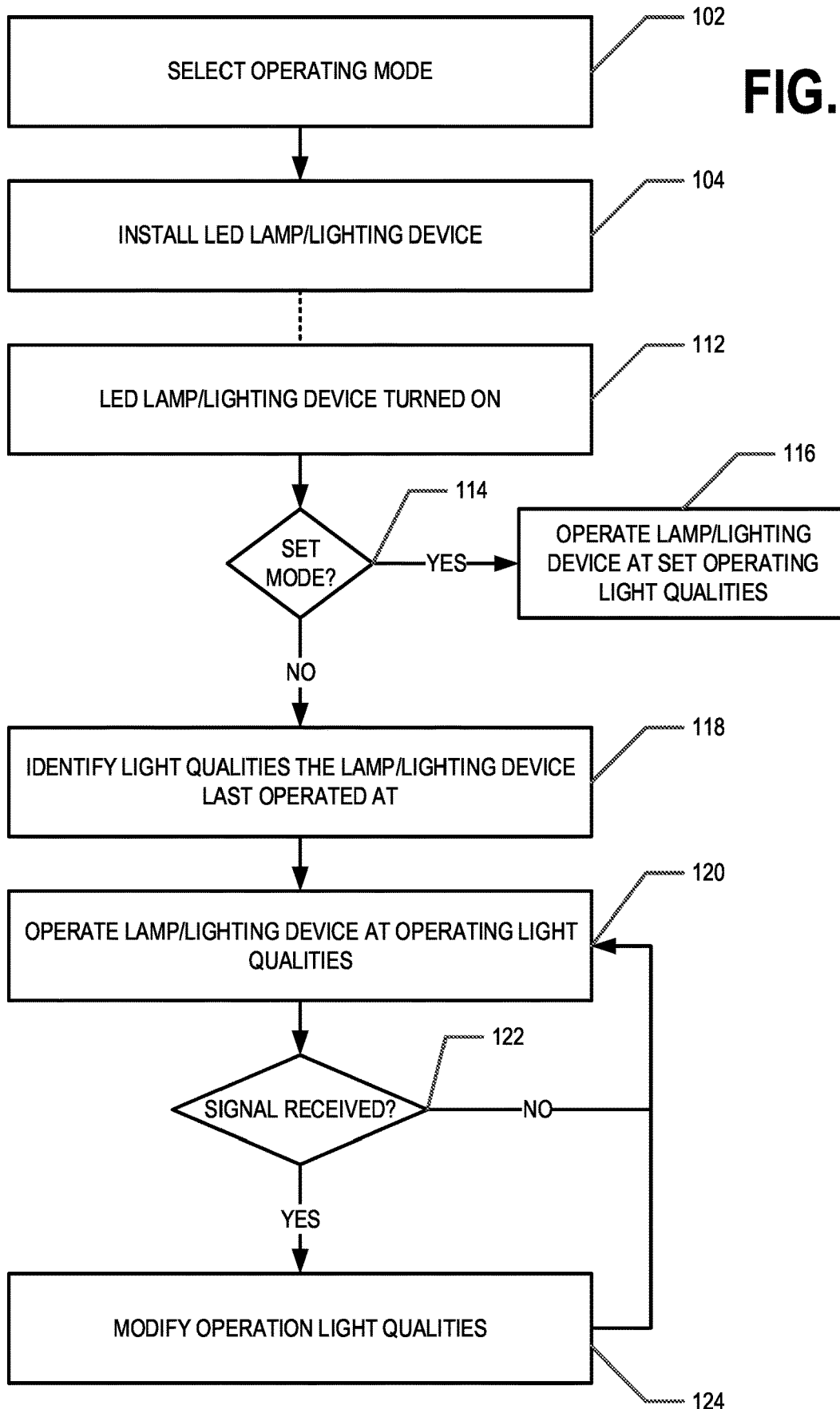
Figure 8:
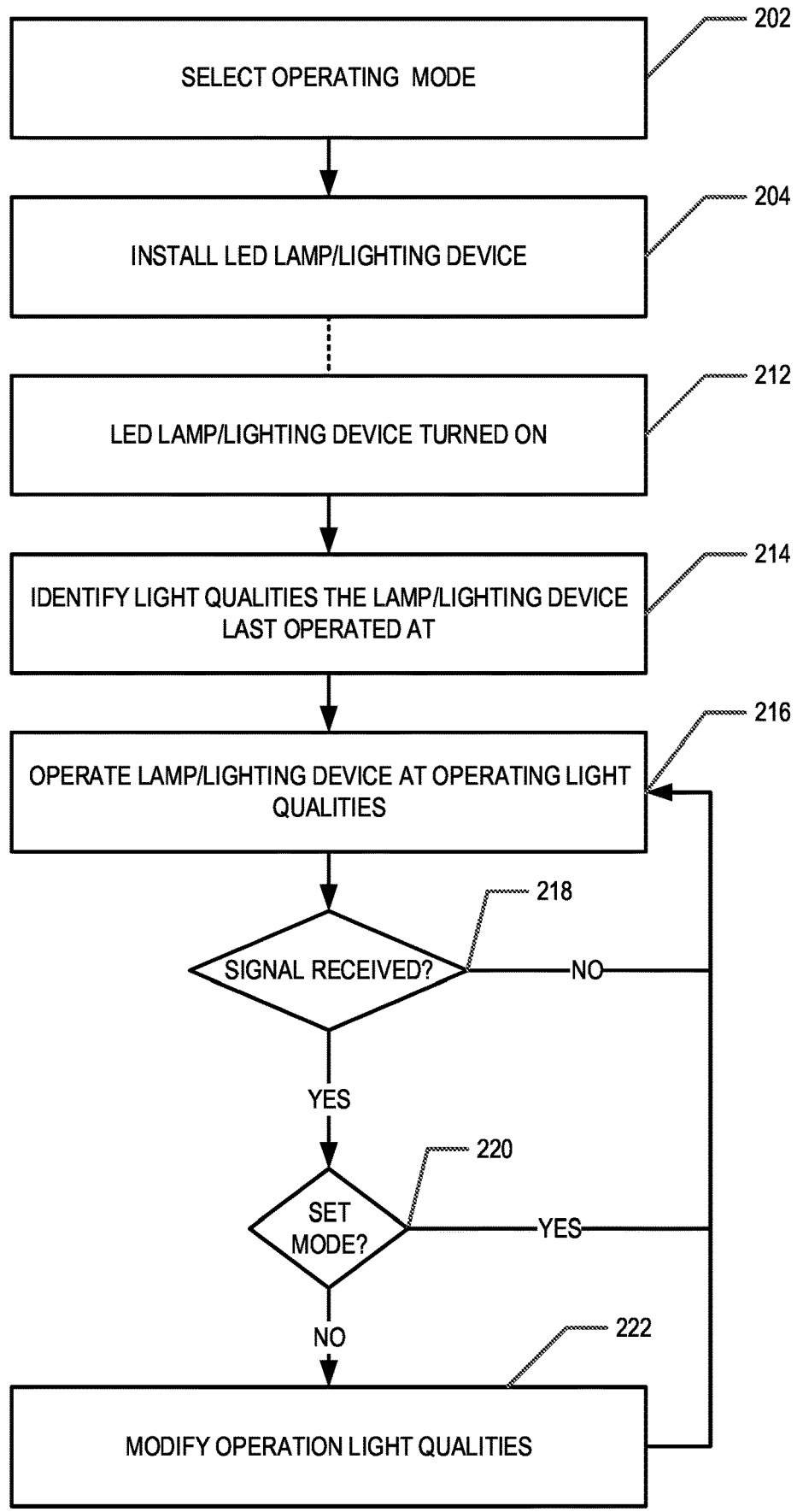

FIG. 7 provides a flowchart illustrating processes and procedures of installing and operating an LED lamp or LED lighting device in accordance with example embodiments of the present invention; and FIG. 8 provides a flowchart illustrating process and procedures of installing and operating an LED lamp or LED lighting device in accordance with other example embodiments of the present invention.

DETAILED DESCRIPTION OF VARIOUS EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Example embodiments of the present invention provide an LED lamp or LED lighting device having two or more user selectable modes. Switching between modes may adjust one or more aspects or qualities of the light provided by the LED lamp or LED lighting device when the LED lamp or LED lighting device is operating. For example, switching between modes may adjust the quality of the light provided by the LED lamp or LED lighting device when the LED lamp or LED lighting device is operating. For example, switching between modes may adjust the brightness, color rendering index (CRI), color temperature, and/or the like of the light emitted by the LED lamp or LED lighting device when the LED lamp or LED lighting device is operating.

Example embodiments of the present invention described herein generally relate to an LED lamp or LED lighting device wherein the operating light aspects or qualities (e.g., brightness, color temperature, CRI, and/or the like of the light emitted by the LED lamp or LED lighting device when the LED lamp or LED lighting device is being operated and/or is turned on), is selectively configurable. For example, example embodiments of the present invention described herein generally relate to an LED lamp or LED lighting device wherein the operating color temperature (e.g., the color temperature of the light emitted by the LED lamp or LED lighting device when the LED lamp or LED lighting device is being operated and/or is turned on), is selectively configurable. However, it should be understood that principles of the present invention may be used to provide an LED lamp or LED lighting device for which one or more aspects or qualities of the light provided during operation of the LED lamp or LED lighting device may be modified through selection of a particular mode. Examples of the aspects that may be modified through mode selection may include, but are not limited to, brightness, CRI, color temperature, and/or combinations thereof.

For example, a user may select a desired operating light aspects or qualities (e.g., color temperature, brightness, CRI, and/or the like, and/or a combination thereof) for the LED lamp or LED lighting device before the LED lamp or LED lighting device is installed. Alternatively, the user may select to operate the LED lamp or LED lighting device in a configurable operating mode following installation. For example, the LED lamp or LED lighting device may be operated in a configurable mode that allows a user to change one or more of the operating light aspects or qualities during operation of the LED lamp or LED lighting device using a remote switch. In example embodiments, a remote switch may be a wall mounted switch mounted in the same room as the LED lamp or LED lighting device and/or within a short range communication technology range of the LED lamp or LED lighting device. In another example, the remote switch may be a handheld device (e.g., a remote control) that is within the same room as the LED lamp or LED lighting device, within a short range communication technology range of the LED lamp or LED lighting device, and/or in communication with the LED lamp or LED lighting device through a wireless network.

As noted above, LEDs may be manufactured that emit light at a variety of color temperatures. Moreover, LEDs may be configured to emit light at a variety of brightness, CRI, and/or having other configurable light aspects or qualities. Embodiments of the present invention allow a user to take advantage of the variety of light aspects or qualities at which LEDs may emit light by allowing the user to operate an LED lamp or LED lighting device at a selectable mode such that the user may select and/or modify aspects or qualities of the emitted light. For example, embodiments of the present invention allow a user to take advantage of the variety of color temperatures at which LEDs may emit light by allowing the user to operate an LED lamp or LED lighting device at a selectable configurable operating color temperature. For example, the user may be able to change the operating color temperature of the LED lamp or LED lighting device as the user desires during the operation of the LED lamp or LED lighting device. The user may also choose to select a programmable operating color temperature for the LED lamp or LED lighting device. For example, the LED lighting device or LED lamp may be programmed to a set operating color temperature mode in which the operating color temperature cannot be changed during operation of the LED lamp or LED lighting device. Thus, embodiments of the present invention allow a user to take advantage of the wide range of color temperatures at which LEDs may produce light.

For example, given the wide array of color temperatures and other light aspects or qualities (e.g., brightness, CRI, etc.) available in LED lamps and LED lighting devices, retailers need to stock a variety of different color temperature, brightness, and/or other light aspect or quality options for each style of LED lamp and/or LED lighting device to provide consumers with the options the consumer's desire. Moreover, it is common in multiple purpose rooms (e.g., family rooms, etc.) that different lighting options may be desired. For example, a light having an operating color temperature of 5000k may be desired if a user is sitting on the couch reading, but the user may prefer a light having an operating color temperature of 3000K when watching television. Traditionally this would require the user to have two lighting options available in the same room. However, example embodiments of the present invention allow the user to have a light source of operating temperature of 3000K and a light source of operating temperature of 5000K while only requiring one lighting device. Similarly, with example embodiments of the present invention, retailers need only to stock LED lamps and/or LED lighting devices based on the style of the lamp and/or lighting device as the operating color temperature and/or other light aspects or qualities of the lamp and/or lighting device are selectable.

In example embodiments, the LED lamp 10 or LED lighting device 20 allows a user to select an operating mode (e.g., a programmable custom mode, a set mode, or a configurable mode). One or more qualities of the light (e.g., color temperature, brightness, CRI, and/or the like) emitted by the LED lamp 10 and/or LED lighting device 20 may then be controlled based on the user-selected operating mode. One or more qualities of the light emitted by the LED lamp 10 and/or LED lighting device 20 may be modified through mode switching (e.g., using switch 30) and/or configured using a remote switch 40 when the user-selected mode is a configurable mode.

Example LED Lamp

Figure 1:
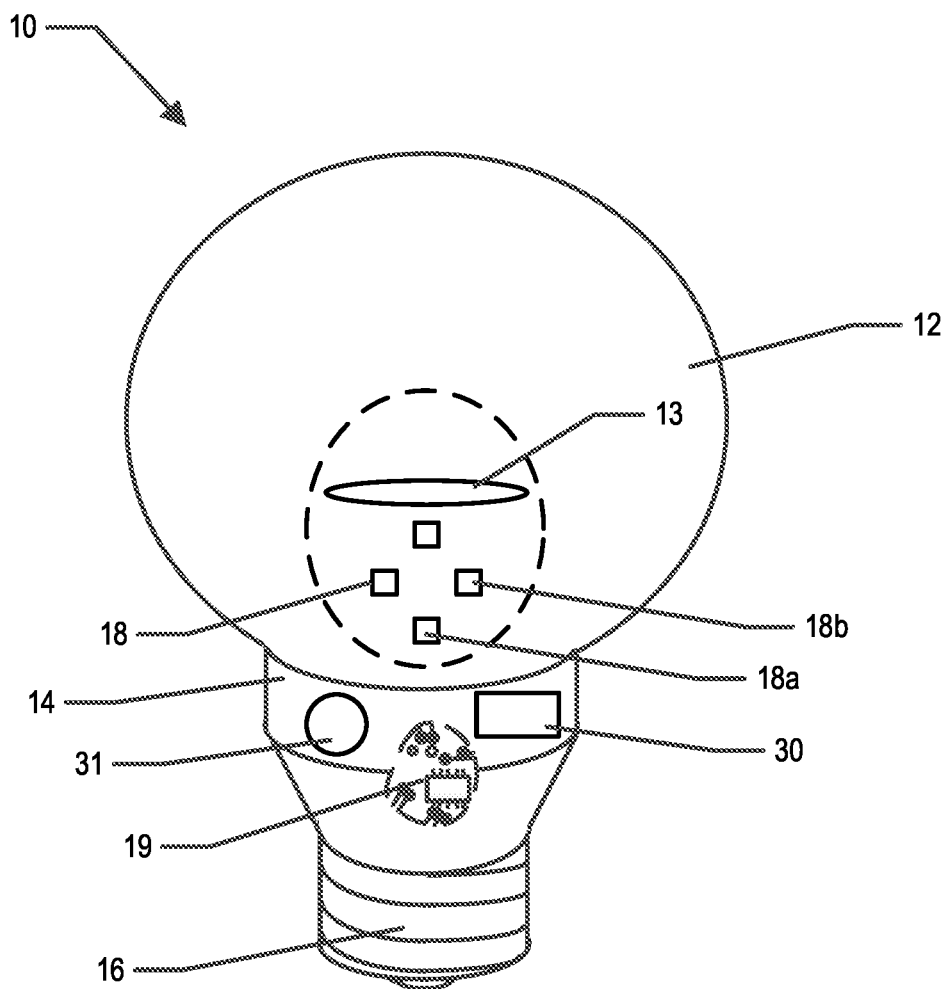
FIG. 1 is a partial cutaway perspective view of an example LED lamp in accordance with an example embodiment of the present invention.
Figure 1A:
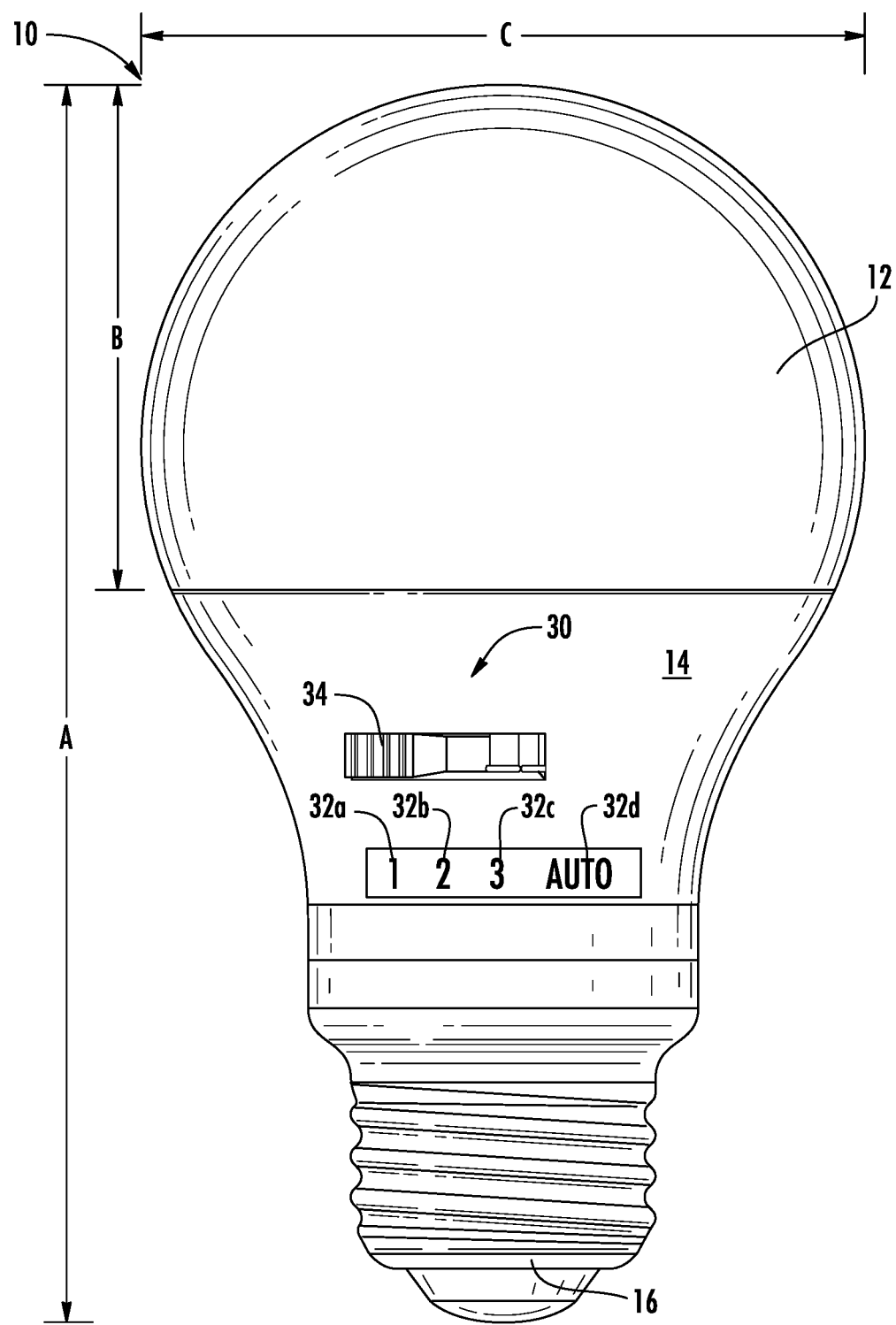
FIG. 1A is a perspective view of an example LED lamp in accordance with an example embodiment of the present invention.

FIG. 1 provides a partial cutaway perspective view of an example LED lamp 10 in accordance with an example embodiment of the present invention. Additionally, FIG. 1A provides a perspective view of an example LED lamp 10 in accordance with an example embodiment of the present invention. In example embodiments, the LED lamp 10 may comprise a lamp envelope 12, a lamp housing 14, a lamp base 16, two or more LED packages 18, driver circuitry 19, a switch control unit 35, a switch 30, and/or the like. In example embodiments, the lamp envelope 12 may be transparent, translucent, and/or semi-translucent and configured to enclose the optical components (e.g., the two or more LED packages 18, optics 13, and/or the like). In example embodiments, the lamp housing 14 may be configured to house the driver circuitry 19, switch control unit 35 (shown in FIG. 4), a heat sink, heat dissipation elements (e.g., fins, radiators, and/or the like), and/or other elements of the LED lamp 10. For example, the switch 30 may be located on an exterior surface of the lamp housing 14. The lamp base 16 may be configured for physically securing the LED lamp 10 into a socket of a lighting device and electrically connecting the driver circuitry 19, switch control unit 35, and/or other electrical component of the LED lamp 10 to the socket such that the LED lamp 10 may be electrically powered through the socket. In example embodiments, the lamp base 16 and/or the LED lamp 10 may be the size of a traditional/standard incandescent lamp. For example, the lamp base 16 and/or the LED lamp 10 may be sized according to an A15, A19, A21, A22, B8, B10, C7, C9, C11, C15, F10, F15, F20 and/or traditional/standard lamp size. For example, the lamp base 16 of the LED lamp 10 shown in FIG. 1A is in accordance with a traditional/standard A19 lamp size. For example, in one embodiment, the length of the LED lamp 10, a, is 111 mm, the length of the lamp envelope 12, b, is 43 mm, and the width of the lamp envelope 12, c, is 59.9 mm or approximately 60 mm. In various embodiments, the size of the LED lamp 10 may vary based as appropriate for the application.

Figure 3:
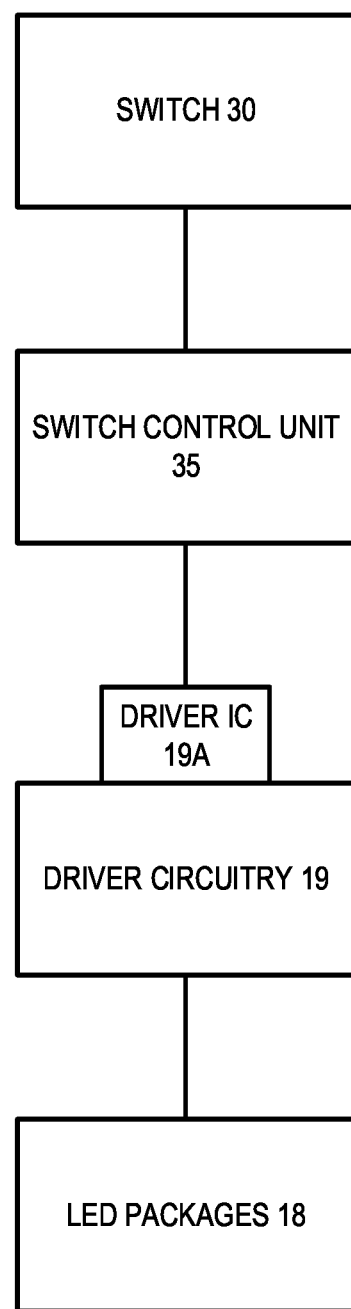
FIG. 3 is a block wiring diagram of an LED lamp or LED lighting device in accordance with example embodiments of the present invention.

FIG. 3 provides a block wiring diagram of an example LED lamp 10 or LED lighting device 20. The electrical components of the LED lamp 10 may comprise a switch 30 in electrical communication with a switch control unit 35. The switch control unit 35 may be in electrical communication with the driver circuitry 19. In an example embodiment, the switch control unit 35 may be in electrical communication with a driver integrated circuit (IC) 19a configured to control, condition, configure and/or the like the electrical current provided to one or more LED packages 18. The driver circuitry 19 may then provide the configurable electrical current to the one or more LED packages 18, causing the LED lighting device to be operated according to the mode selected through the switch 30.

Example LED Lighting Device

Figure 2:
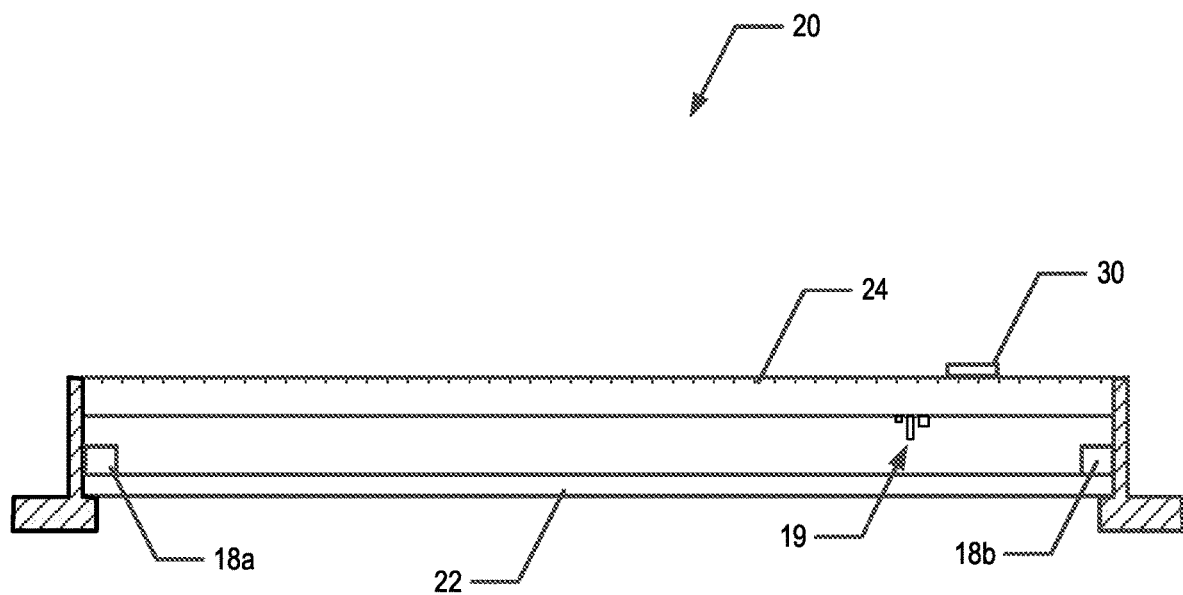
FIG. 2 is a cross section of an example LED lighting device in accordance with an example embodiment of the present invention.
Figure 2A:
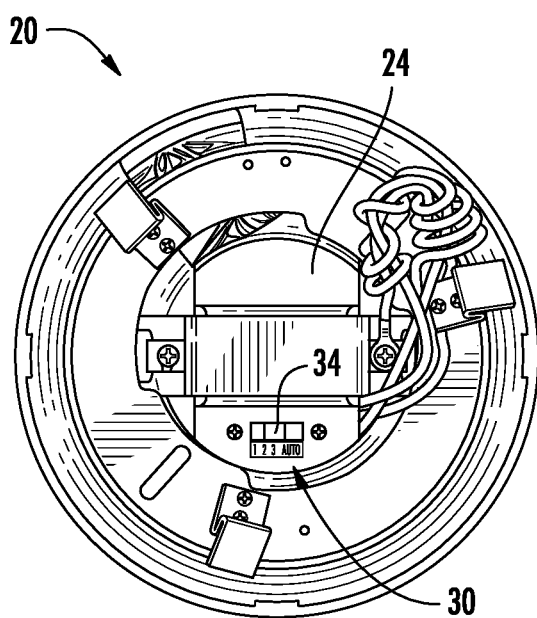
FIG. 2A is a back view of an example LED lighting device in accordance with an example embodiment of the present invention.
Figure 2B:
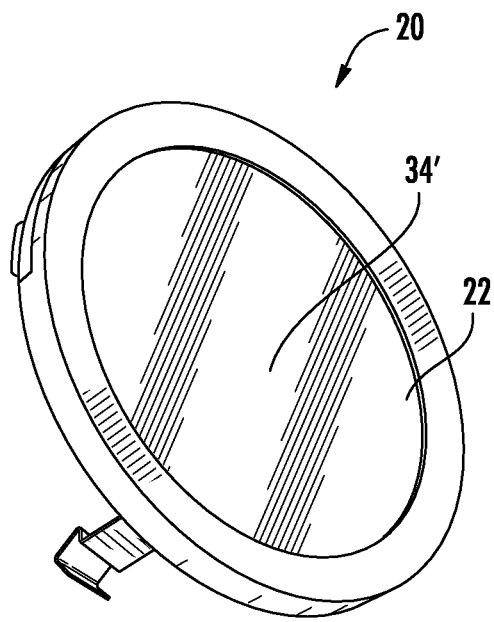
FIG. 2B is a front view of the example LED lighting device shown in FIG. 2A.
Figure 2C:
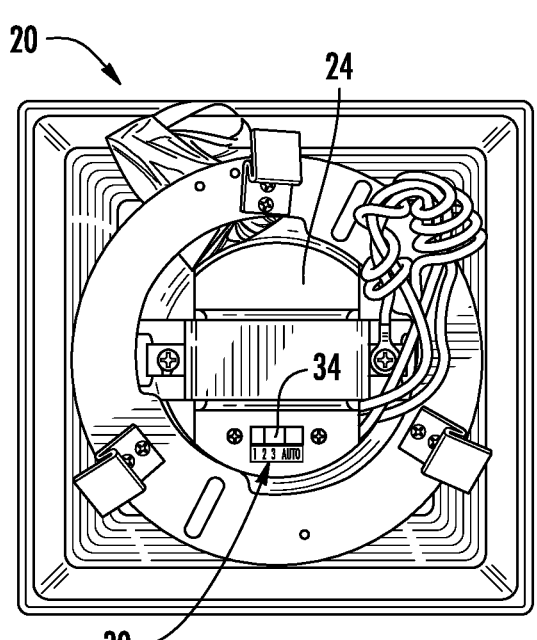
FIG. 2C is a back view of another example LED lighting device in accordance with an example embodiment of the present invention.
Figure 2D:
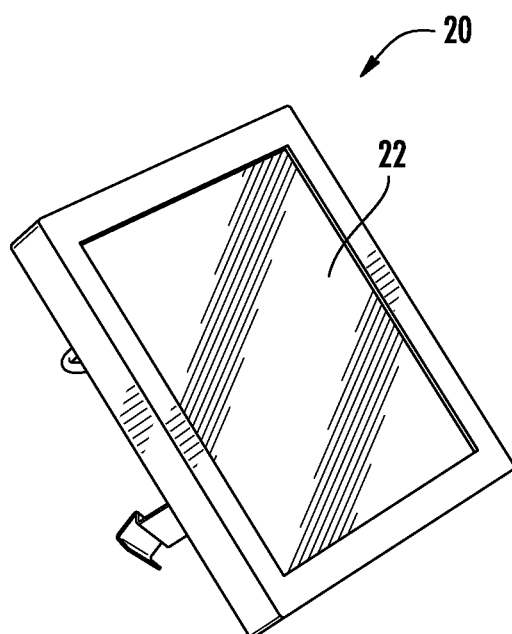
FIG. 2D is a front view of the example LED lighting device shown in FIG. 2C.
Figure 2E:
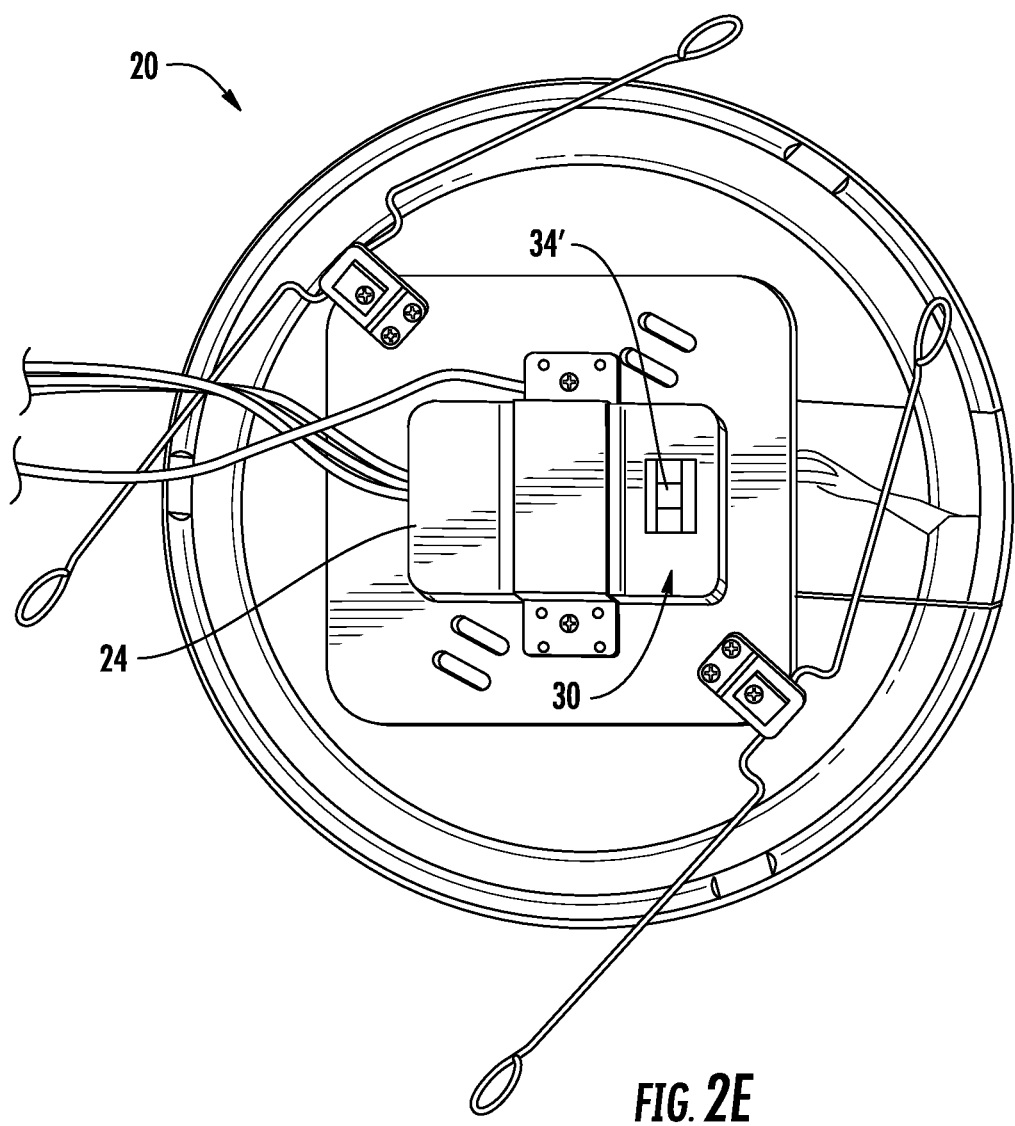
FIG. 2E is a back view of another example LED lighting device in accordance with an example embodiment of the present invention.

FIG. 2 provides a cross section view of an example LED lighting device 20. The illustrated lighting device 20 is an edge-lit LED flat panel lighting fixture configured to be mounted on a ceiling or wall, suspended as a pendant, and/or the like. In various embodiments, the LED lighting device 20 may be a lighting fixture, a luminaire, a floor lamp, a desk lamp, and/or the like. FIGS. 2A, 2C, and 2E provide a back views of example LED lighting devices 20 that are configured to be flush mounted to a mounting surface (e.g., wall, ceiling, and/or the like). In various embodiments, an example LED lighting device 20 may be flush mounted to a mounting surface, within a recessed lighting receptacle, and/or the like. FIGS. 2B and 2D provide front views of the example lighting devices 20 shown in FIGS. 2A and 2C, respectively.

In example embodiments, the LED lighting device 20 comprises a device housing 24, a device lens 22, one or more LED packages 18, driver circuitry 19, a switch control unit 35, a switch 30, and/or the like. For example, the device housing 24 may be configured to house the driver circuitry 19; switch control unit 35; one or more LED packages 18; one or more optical elements; one or more heat sink elements; one or more heat dissipation elements; one or more mounting elements configured for mounting the LED lighting device 20 to a ceiling, wall, as a pendant, as a recessed lighting device, and/or the like; one or more stand elements configured for supporting and providing an aesthetic appearance to a luminaire; and/or the like. For example, the switch 30 may be mounted on an exterior surface of the LED lighting device 20. For example, the switch 30 may be mounted on a back, bottom, or otherwise generally hidden surface of the device housing 24 such that the switch 30 is not generally viewable by a user when the LED lighting device 20 is in operation. In some embodiments, the switch 30 may be accessible to the user when the LED lighting device 20 is installed. In such embodiments, the switch 30 may still be generally hidden and/or not located where the switch 30 is easily viewable (e.g., the switch 30 is generally not located on the front of the LED lighting device 20).

In example embodiments the device lens 22 may be transparent, translucent, and/or at least semi-translucent and configured to enclose the optical and/or electrical components of the LED lighting device 20 within the device housing 24. In example embodiments, the electrical components of the LED lighting device 20 (e.g., the driver circuitry 19, switch control unit 35, and/or the like) may be configured to be directly wired to line voltage (e.g., through a junction box) or may be configured to be connected to line voltage through a power cord comprising a two- or three-prong polarized plug.

FIG. 3 provides a block wiring diagram of an example LED lamp 10 or LED lighting device 20. The electrical components of the LED lighting device 20 may comprise a switch 30 in electrical communication with a switch control unit 35. The switch control unit 35 may be in electrical communication with the driver circuitry 19. In an example embodiment, the switch control unit 35 may be in electrical communication with a driver integrated circuit (IC) 19a configured to control, condition, configure and/or the like the electrical current provided to one or more LED packages 18. The driver circuitry 19 may then provide the configurable electrical current to the one or more LED packages 18, causing the LED lighting device to be operated.

Exemplary LED Packages

Figure 4A:
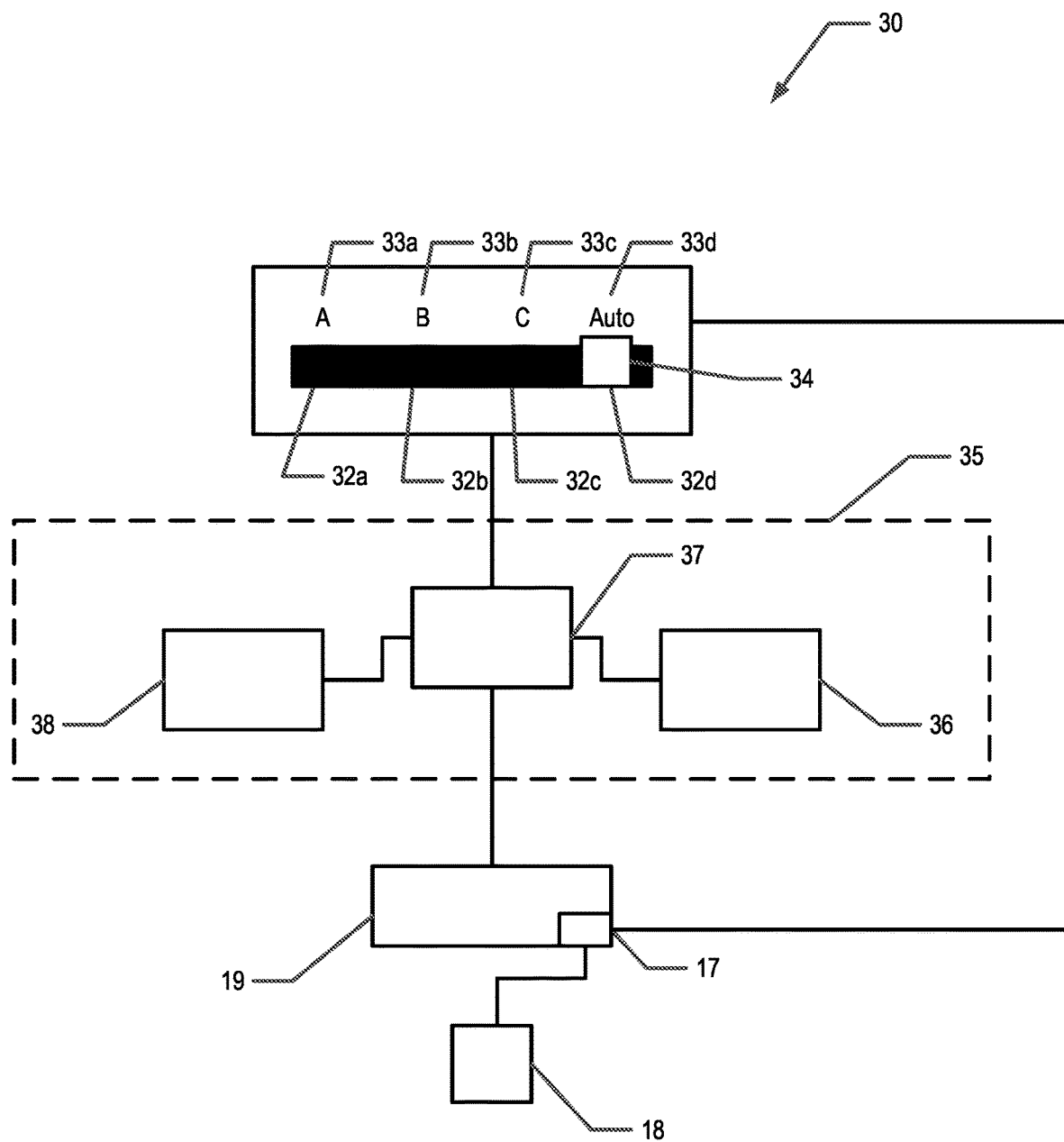
FIG. 4A is another block diagram of at least some of the electrical components of an LED lamp or LED lighting device in accordance with example embodiments of the present invention.

In example embodiments, the LED lamp 10 or LED lighting device 20 may comprise one or more LED packages 18. In example embodiments, an LED package 18 comprises one or more LED chips, electrical contacts, and optionally phosphor (e.g., to cause the LED package to emit white light). The LED package 18 may further comprise encapsulant to protect the one or more LED chips, wire bonds, and the phosphor. In an example embodiment, the LED packages 18 may comprise one or more alternate current (AC) driven LEDs. In some embodiments, the LED package 18 may further comprise one or more optical elements. In example embodiments, the one or more LED packages 18 may comprise two or more LED packages 18. In example embodiments, the two or more LED packages may comprise at least one first LED package 18a and at least one second LED package 18b. The first LED package 18a may be configured to emit light at a first color temperature and the second LED package 18b may be configured to emit light at a second color temperature. The second color temperature may be different from the first color temperature. For example, the first color temperature may be 3000K or 2700K and the second color temperature may be 5000K. In example embodiments, the two or more LED packages 18 may further comprise a third and/or fourth LED package configured to emit light at a third and/or fourth color temperature, respectively, wherein the third and/or fourth color temperature are different from the first and second color temperatures. For example, in various embodiments, one or more of the LED packages 18 may be configured to emit light of at least one of 2700K, 3000K, 3500K, 4000K, 5000K, 5700K, 6000K, 7000K, 7500K and/or other color temperatures, as appropriate for the application. For example, as shown in FIG. 4A, the LED lamp 10 or LED lighting device may be configured to selectively provide light of color temperature A, B, or C, wherein A, B, and C may be any preset color temperature provided each is different relative to one another In example embodiments, the two or more LED packages 18 may be in electrical communication with driver circuitry 19 such that the two or more LED packages 18 may be operated by the driver circuitry 19. For example, the driver circuitry 19 may provide a controlled electrical current to at least one of the LED packages 18. For example, the driver circuitry 19 may be configured to only operate first LED packages 18a to cause the LED lamp 10 or LED lighting device 20 to emit light of the first color temperature. In another example, the driver circuitry 19 may be configured to only operate second LED packages 18b to cause the LED lamp 10 or LED lighting device 20 to emit light of the second color temperature. In another example, the driver circuitry 19 may be configured to operate one or more (e.g., half) of the first LED packages 18a and one or more (e.g., half) of the second LED packages 18b to cause the LED lamp 10 or LED lighting device 20 to emit light of a third color temperature. In example embodiments, the first color temperature, second color temperature, and third color temperature may be different from one another. For example, the first color temperature may be 3000K, the second color temperature may be 5000K, and the third color temperature may be 4000K. In some embodiments, the LED lamp 10 or LED lighting device 20 may comprise LED packages 18 configured to emit light at more than two distinct color temperatures (e.g., three, four, or more distinct color temperatures).

In example embodiments, the one or more LED packages 18 may be configured to provide light that varies in brightness, color temperature, CRI, and/or the like based on the current provided to the one or more LED packages 18 by the driver circuitry 19. For example, the driver circuitry may provide a particular current to an LED package 18 to cause the LED package 18 to provide light having particular light aspects or qualities.

In example embodiments, the LED packages 18 may comprise one or more LED packages 18 that are configured to emit light other than "white" light. For example, the LED packages 18 may comprise one or more LED packages 18 configured to emit a red or amber light that may be operated to increase the CRI of the light emitted by the LED lamp 10 or LED lighting device 20.

Example Driver Circuitry

In example embodiments, the driver circuitry 19 may be configured to provide a controlled electrical current to at least one of the LED packages 18 during operation of the LED lighting device 20 or LED lamp 10. In various embodiments, the driver circuitry 19 may comprise a circuit portion configured to convert AC voltage into DC voltage. In some embodiments, the driver circuitry 19 may comprise a circuit portion configured to control the current flowing through the two or more LED packages 18. In certain embodiments, the driver circuitry 19 may comprise a circuit portion configured to dim the LED lamp 10 or LED lighting fixture 20. In various embodiments, additional circuit components may be present in the driver circuitry 19. Similarly, in various embodiments, all or some of the circuit portions mentioned here may not be present in the driver circuitry 19. In some embodiments, circuit portions listed herein as separate circuit portions may be combined into one circuit portion. As should be appreciated, a variety of driver circuitry configurations are generally known and understood in the art and any of such may be employed in various embodiments as suitable for the intended application, without departing from the scope of the present invention.

In example embodiments, the driver circuitry 19 may be configured to operate subsets of the two or more LED packages 18 at a particular given moment in time. For example, if a first color temperature has been selected by a user as the operating color temperature, the driver circuitry 19 may be configured to operate one or more first LED packages 18a configured to emit light at the selected first color temperature. If a second color temperature has been selected by the user as the operating color temperature, the driver circuitry 19 may be configured to operate one or more second LED packages 18b configured to emit light at the second selected color temperature. If a third color temperature has been selected by the user as the operating color temperature, the driver circuitry 19 may be configured to operate at least a portion of the first LED packages 18a (e.g., half of the first LED packages 18a) and at least a portion of the second LED packages 18b (e.g., half of the second LED packages 18b) to provide (e.g., via a combination of the first and second LED packages) a selected third color temperature that is a composite, mixture, or superposition of the first and second color temperatures. The selection of which LED packages 18 are operated by the driver circuitry 19, when the LED lamp 10 or LED lighting device 20 is operated, is determined by the status of the switch 30 and/or by the switch control unit 35. For example, the driver circuitry 19 may comprise a plurality of provider circuits 17 configured to provide a controlled electrical current to a subset of the two or more LED packages 18 depending on the selected operating color temperature and/or the status of the switch 30.

In another example, the driver circuitry 19 may be configured to provide a particular current to one or more of the LED packages 18 to provide light having specific light aspects qualities (e.g., brightness, color temperature, CRI, and/or the like). For example, the driver circuitry 19 may be configured to drive one or more LED packages 18 such that the LED packages provide light having the desired light aspects or qualities. The determination of how one or more of the LED packages 18 should be driven (e.g., what current should be supplied to the LED packages 18) may be determined by the status of the switch 30 and/or by the switch control unit 35. Based on the desired light aspects or qualities, different LED packages 18 may be driven differently. For example, LED packages 18 may be driven differently from a red or amber LED package 18 that is being operated to increase the CRI of the light emitted by the LED lamp 10 or LED lighting device 20. Thus, the provider circuits 17 may be configured to provide various LED packages 18 with a particular configurable current such that the composite light emitted by the LED lamp 10 or LED lighting device 20 has the user desired light aspects or qualities.

For example, in an example embodiment (with reference to FIG. 4) that allows a user to choose between three different operating color temperature options, the driver circuitry 19 may comprise three distinct provider circuits 17 for providing the controlled electrical current to the at least one of the two or more LED packages 18 for operation. For example, the switch control unit 35 and/or the position of the switch selector 34 may determine which provider circuit 17 is used during the operation of the LED lamp 10 or LED lighting device 20. Generally, only one of the provider circuits 17 is in use at a given time. For example, a first provider circuit 17 may be configured to provide electrical current to one or more first LED packages 18a when the selected operating color temperature is the first color temperature, a second provider circuit 17 may be configured to provide electrical current to one or more second LED packages 18b when the selected operating color temperature is the second color temperature, and a third provider circuit 17 may be configured to provide electrical current to at least one first LED package 18a and at least one second LED package 18b when the selected operating color temperature is the third color temperature. The selection of the operating color temperature may be based at least in part on the status of a switch 30 (e.g., the position of the switch selector 34) and/or by a switch controller unit 35.

In example embodiments, various configurations of provider circuits 17 may be applied. For example, as noted above, a provider circuit 17 may be configured to provide electrical current to only the first LED packages 18a, only the second LED packages 18b, or a predetermined combination of the first and second LED packages 18a and 18b. For example, a provider circuit 17 may be configured to provide electrical current to half of the first LED packages 18a and half of the second LED packages 18b to provide light of the third color temperature. In another example, a provider circuit 17 may be configured to provide electrical current to 25% of the first LED packages 18a and 75% of the second LED packages 18b to provide light of a fourth color temperature. It should be understood that a provider circuit 17 may be configured to provide controlled electrical current to various combinations of the first LED packages 18a and the second LED packages 18b to provide various color temperature options. Furthermore, in example embodiments, the two or more LED packages 18 may comprise three or more LED packages 18. For example, the LED packages 18 may comprise at least one first LED package 18a configured to emit light at a first color temperature, at least one second LED package 18b configured to emit light at a second color temperature, and at least one third LED package configured to emit light at a third color temperature, the first, second, and third color temperatures being different from one another. In such an embodiment, a provider circuit 17 may be configured to provide electrical current to at least one of the first LED packages 18a, at least one of the second LED packages 18b, and at least one of the third LED packages to provide a three color blend. It should be understood that LED packages configured to emit light at additional color temperatures may be incorporated into the LED lamp 10 or LED lighting device 20 as desired and/or appropriate for the application and that various combinations of the LED packages may be activated to cause the LED lamp 10 or LED lighting device 20 to emit light of a desired operating color temperature.

As noted above, the light aspects or qualities (e.g., brightness, color temperature, CRI, and/or the like) may be controlled by how the one or more LED packages 18 are operated (instead of and/or in addition to which of the LED packages 18 are operated). In example embodiments, one or more configurable qualities of the light emitted by the LED lamp 10 or the LED lighting device 20 may configured by controlling the current provided to one or more of the LED packages 18. In particular, the driver circuitry 19 may drive the one or more LED packages 18 with a higher or lower current to modify the brightness, color temperature, CRI, and/or the like of the light emitted by the one or more LED packages 18. In another example, the driver circuitry 19 may increase or decrease the number of LED packages 18 being driven to increase or decrease the brightness of the light emitted by the LED lamp 10 or the LED lighting device 20. In another example, one or more red or amber LED packages 18 may be turned on (e.g., electrical current may be supplied thereto by the driver circuitry 19) to increase the CRI of the light emitted by the LED lamp 10 or LED lighting device 20. In another example, the primary or secondary optics used to condition the light emitted by the LED lamp 10 or LED lighting device 20. For example, the optics 13 may be modified, the amount of phosphor through which an LED is emitting may be modified, and/or the like. Thus, in example embodiments, one or more qualities of the light emitted by the LED lamp 10 or LED lighting device 20 may be modified, controlled, configured, and/or the like by changing and/or controlling the amount of current provided to one or more LED packages 18, which LED packages 18 of the two or more LED packages 18 are being operated, physically changing the primary and/or secondary optics conditioning the light, and/or the like. Thus, for example in an embodiment configured to provide configurable brightness settings or modes, the dimming of the LED lamp 10 or LED lighting device 20 may be controlled by the switch control unit 35 and/or driver circuitry 19 rather than by the externally provided current.

In example embodiments, when the LED lamp 10 or LED lighting device 20 is in a configurable operating mode, interaction with the remote switch 40 (e.g., reception of a signal from the remote switch 40) may cause the topology of the driver circuitry to be altered. For example, user interaction with the remote switch 40 may cause a signal to be provided to the switch control unit 35. The switch control unit 35 may then cause a change in the topology of the driver circuitry 19, thereby causing the driver circuitry 19 to operate a different set of LED packages 18, drive one or more LED packages 18 with a modified current, and/or the like.

Example Switch

In example embodiments, the LED lamp 10 and/or LED lighting device 20 comprises a switch 30. In example embodiments, the switch 30 may be configured to allow a user to select an operating mode (e.g., a programmable custom mode, a set mode, or a configurable mode). One or more aspects or qualities of the light (e.g., color temperature, brightness, CRI, and/or the like) emitted by the LED lamp 10 and/or LED lighting device 20 may then be controlled based on the user-selected operating mode. In example embodiments, the switch 30 may be a mechanical switch, electro-mechanical switch, an infrared switch, and/or the like. For example, if the switch 30 is a mechanical switch, the switch 30 may comprise a slide switch, a dial, a set of binary switches, and/or the like. In an example embodiments, the switch 30, and/or a user interface thereof, may be disposed on an exterior surface of the lamp housing 14 or the device housing 24. FIGS. 3 and 3A provide block diagrams of at least some of the electrical components of an LED lamp 10 or LED lighting device 20, including a switch 30 and a switch control unit 35, in accordance with example embodiments of the present invention. In example embodiments, the switch 30 may comprise a plurality of switch positions 32 (e.g., 32a, 32b, 32c, 32d), switch position indicators 33 (e.g., 33a, 33b, 33c, 33d), and a switch selector 34. For example, the switch 30 may comprise four switch positions 32a, 32b, 32c, and 32d, in example embodiments. In other embodiments, the switch 30 may comprise more than four switch positions 32 (e.g., 32a, 32b, 32c, 32d). For example, in various embodiments, the switch 30 may comprise two, three, four, five, six, seven, eight, or more switch positions with each switch position corresponding to either a set operating mode, a selectively configurable operating mode, or a programmable custom operating mode. One of the switch positions may correspond to a configurable operating mode (e.g., a configurable operating color temperature mode, configurable brightness mode, configurable brightness-color temperature mode, etc.) and the remaining switch positions may correspond to set operating modes (e.g., set operating color temperature modes, set brightness modes, set operating brightness-color temperature modes, etc.) wherein the different switch positions select the particular set light aspects or qualities (e.g., brightness, operating color temperature, CRI, and/or the like). For example, switch positions 32a, 32b, and 32c may correspond to set operating color temperature modes with each position corresponding to a particular set operating color temperature. The switch position 32d may correspond to a configurable operating color temperature mode.

In some embodiments, the switch 30 may provide the user with one or more programmable custom operating modes. In an example embodiment, the switch 30 may comprise a custom set operating color temperature mode, in which a user may define and/or select a predefined mixture of the first, second, third, and/or the like operating color temperatures such that the LED lamp 10 or LED lighting device 20 provides a light at the custom set operating color temperature. In another example, the switch 30 may comprise a custom program operating brightness-color temperature operating mode such that the LED lamp 10 or LED lighting device 20 provides light at a custom set operating color temperature at a set brightness. In another example, the switch 30 may comprise a custom program operating mode wherein the switch control unit 35 is configured to cause the operating color temperature, brightness, and/or CRI to change at configurable times (e.g., clock time) or at configurable periods of time. For example, a user may wish to have the LED lamp 10 or LED lighting device 20 operate at one operating color temperature during the morning hours, another operating color temperature during the afternoon, and another operating color temperature in the evening or night time hours. In another example, a user may want the LED lamp 10 or LED lighting device 20 to operate at one operating color temperature, brightness, and/or CRI for the first twenty minutes the LED lamp 10 or LED lighting device 20 is operating and then to operate at another operating color temperature, brightness, and/or CRI for the next three hours or for as long as the LED lamp 10 or LED lighting device 20 remains in constant operation. In example embodiments having programmable custom operating mode options, additional user interface components (e.g., in addition to the switch 30) may be provided for the programming of the programmable custom operating mode. The additional user interface components may be located on the housing 14, 24 of the LED lamp 10 or LED lighting device 20 and/or on a remote switch 40 (e.g., through a mobile computing entity 40' user interface, wherein the computing entity 40' is executing an application causing the computing entity 40' to operate as a remote switch 40). In example embodiments, such additional user interface components may comprise various switches, dials, displays, touchscreen displays, buttons, knobs, and/or the like as commonly understood in the art.

A switch position indicator 33 (e.g., 33a, 33b, 33c, 33d) may correspond to each switch position 32 (e.g., 32a, 32b, 32c, 32d). The switch position indicator 33 (e.g., 33a, 33b, 33c, 33d) may be configured to indicate the operating mode (e.g., color temperature and/or option or mode, etc.) selected by placing the switch selector 34 in the corresponding switch position. For example, switch position indicator 33a may show approximately where the switch position 32a is located and may indicate the color temperature and/or option or mode selected by placing the switch selector 34 in switch position 32a. For example, the switch position indicator 33a indicates that if the switch selector 34 is placed in the switch position 32a, a set operating color temperature mode is selected with the set operating color temperature being 3000K. Similarly, the switch position indicator 33b indicates that if the switch selector 34 is placed in the switch position 32b, a set operating color temperature mode is selected with the set operating color temperature being 4000K; the switch position indicator 33c indicates that if the switch selector 34 is placed in the switch position 32c, a set operating color temperature mode is selected with the set operating color temperature being 5000K; and the switch position indicator 33d indicates that if the switch selector 34 is placed in the switch position 32d, the configurable operating color temperature mode is selected. For example, if the switch selector 34 is placed in switch position 34d, the operating color temperature of the LED lamp 10 or LED lighting device 20 may be configurable by using a wall switch, remote control, and/or the like (e.g., remote switch 40 shown in FIG. 5). In another example, as shown in FIG. 4A, the switch position indicator 33a indicates that if the switch selector 34 is placed in the switch position 32a, a set operating mode is selected with the set light aspects or qualities being A; the switch position indicator 33b indicates that if the switch selector 34 is placed in the switch position 32b, a set operating mode is selected with the set light aspects or qualities being B; the switch position indicator 33c indicates that if the switch selector 34 is placed in the switch position 32c, a set operating mode is selected with the set light aspects or qualities being C; and the switch position indicator 33d indicates that if the switch selector 34 is placed in the switch position 32d, the configurable operating is selected wherein a user may use a remote switch 40 to toggle between A, B, and C, wherein A, B, and C may be operating states of any preset color temperature, brightness, CRI, and/or the like, provided each operating state is different in at least one light aspect or quality relative to one another. The status of the switch 30 is determined by the switch position 32 (e.g. 32a, 32b, 32c, 32d) in which the switch selector 34 is positioned. The switch 30 has been illustrated herein as slider switch. It should be understood however, that the switch 30 may take a variety of forms as appropriate for the application. For example, FIG. 2E illustrates an example switch 30 having a multiple position pivot switch selector 34' having switch positions that are selected based on the angle of the pivot switch selector 34'.

In example embodiments, a user may change the operating light aspects or qualities (e.g., operating color temperature, brightness, CRI, and/or the like) of the LED lamp 10 or LED lighting device 20 by changing the positions of the switch selector 34. For example, in various embodiments, the user may change the position of the switch selector 34 while the LED lamp 10 or LED lighting device 20 before installation of the LED lamp 10 or LED lighting device 20, after installation of the LED lamp 10 or LED lighting device 20 but when the LED lamp 10 or LED lighting device 20 is not in use (e.g., is turned off and not emitting light), or while the LED lamp 10 or LED lighting device 20 is in use (e.g., is turned on and is emitting light). In example embodiments, if the position of the switch selector 34 is changed while the LED lamp 10 or LED lighting device 20 is in use, causing the light aspects or qualities thereof to change, the change of the light aspects or qualities may occur within two seconds of the position of the switch selector 34 being changed.

In an example embodiment, a user-selection switch 31 (e.g., a toggle switch, button, and/or the like) may be disposed on the LED lamp 10 or LED lighting device 20 such that user-selection may be received through user-selection switch at the LED lamp 10 or LED lighting device 20. Thus, the user may change the operating light aspects or qualities of the LED lamp 10 or LED lighting device 20 when the LED lamp 10 or LED lighting device 20 is in a configurable operating mode by interacting with the user-selection switch 31 rather than by using the remote switch 40.

Example Switch Control Unit

In example embodiments, the LED lamp 10 or LED lighting device 20 may comprise a switch control unit 35. In example embodiments, the switch control unit 35 may be configured to cause the driver circuitry 19 to operate one or more LED packages 18 in accordance with the user-selected operating mode (e.g., a programmable custom mode, a set mode, or a configurable mode). In example embodiments, the switch control unit 35 may be a microcontroller unit (MCU). For example, the switch control unit 35 may comprise a single integrated circuit. In example embodiments, the switch control unit 35 comprises one or more processing elements 37, one or more memory elements 36, and/or one or more communication interface elements 38. In example embodiments, the switch control unit 35 may be in wired (e.g., hard-wired) communication with the switch 30 and/or configured to receive signals from the remote switch 40. In example embodiments, the switch control unit 35 may be configured to cause one or more operating light aspects or qualities (e.g., operating color temperature, brightness, CRI) of the LED lamp 10 or the LED lighting device 20 to be modified based on a received signal from the remote switch 40, store information/data identifying the last light aspects or qualities at which the LED lamp 10 or the LED lighting device 20 was operated at, and/or the like. For example, the switch control unit 35 may be configured to receive user selection of a programmable custom operating mode and control the LED lamp 10 or the LED lighting device 20 to operate in accordance with the programmable custom operating mode or other user-selected operating mode (e.g., set operating mode or configurable operating mode).

In example embodiments, the one or more processing elements 37 (also referred to as processors, processing circuitry, processing device, and/or similar terms used herein interchangeably) that communicate with other elements within the switch control unit 35. For example, the processing element(s) 37 may communicate with the memory element(s) 36, communication interface element(s) 38, and/or components of the driver circuitry 19 via direct electrical connection, a bus, and/or the like. For example, the processing element(s) 37 may be configured to process input received through the switch 30 (and/or additional user interface components), process a signal received from the remote switch 40 (e.g., through the communication interface element 38), cause the memory element 36 to store a current operating color temperature, cause one provider circuit 17 to be activated (e.g., to provide a controlled electric current to the corresponding at least one LED package 18), cause another provider circuit 17 to be de-activated (e.g., to stop providing an electric current to the corresponding at least one LED package 18), cause a different and/or modified current to be provided to the provider circuit 17 (e.g., such that the LED package 18 is driven in a modified manner by the provider circuit 17) and/or the like. As will be understood, the processing element 37 may be embodied in a number of different ways. For example, the processing element 37 may be embodied as one or more complex programmable logic devices (CPLDs), microprocessors, multi-core processors, co-processing entities, application-specific instruction-set processors (ASIPs), microcontrollers, and/or controllers. Further, the processing element 37 may be embodied as one or more other processing devices or circuitry. The term circuitry may refer to an entirely hardware embodiment or a combination of hardware and computer program products. Thus, the processing element 37 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 37 may be configured for a particular use or configured to execute instructions stored in volatile or non-volatile media or otherwise accessible to the processing element 37. As such, whether configured by hardware or computer program products, or by a combination thereof, the processing element 37 may be capable of performing steps or operations according to embodiments of the present invention when configured accordingly.

The memory element(s) 36 may be non-transitory and may include, for example, one or more volatile and/or non-volatile memories. In other words, for example, the memory element 36 may be an electronic storage device (e.g., a computer readable storage medium) comprising gates configured to store data (e.g., bits) that may be retrievable by a machine (e.g., a computing device like the processing element 37). The memory element 36 may be configured to store information, data, content, applications, instructions, or the like for enabling the switch control unit 35 to carry out various functions in accordance with an example embodiment of the present invention. For example, the memory element 35 could be configured to buffer input data for processing by the processing element 37 (e.g., a signal received from the remote switch 40). In example embodiments, the memory element 36 may be configured to store a most recent operating light aspects or qualities (e.g., color temperature, brightness, CRI, and/or the like, and/or combination thereof). Additionally or alternatively, the memory element 36 could be configured to store instructions for execution by the processing element 37.

As indicated, in one embodiment, the switch control unit 35 may also include one or more communications interface elements 38 for communicating with the remote switch 40.

For example, the communications interface element 38 may be configured to receive a signal from the remote switch 40 indicating user selection of, activation of, and/or interaction with an on/off or power button, a dimmer switch, or a remote selector switch configured to select or modify the operating color temperature of the LED lamp 10 or LED lighting device 20, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communications interface element 38 may be configured to communicate via a wireless communication technology, such as a short range communication technology. For example, the communications interface element 38 may be configured to receive and/or send signals using IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

In example embodiments, the switch control unit 35 may be configured to cause the LED lamp 10 or LED lighting device 20 to operate at the operating color temperature, brightness, CRI, and/or other particular light aspect or quality, when the LED lamp 10 or LED lighting device 20 is turned on. For example, the switch control unit 35 may be configured to determine the status of the switch 30 and operate the LED lamp 10 or LED lighting device 20 accordingly. For example, the switch control unit 35 may be configured to determine if the position of the switch selector 34 is a position corresponding to a set operating mode, to the position corresponding to the configurable operating mode, and/or to a position corresponding to a programmable custom operating mode. If the switch selector 34 is in a switch position 32 (e.g., 32a, 32b, 32c) corresponding to a set operating mode, the switch control unit 35 (e.g., the processing element 37) may determine the corresponding color temperature (and/or other light aspects or qualities) and cause the LED lamp 10 or LED lighting device 20 to operate at the corresponding color temperature (and/or other light aspects or qualities). For example, if the switch control unit 35 determines that the switch selector 34 is in switch position 32a, the switch control unit 35 may then determine that the corresponding color temperature is 3000K and cause the LED lamp 10 or LED lighting device 20 to be operated at 3000K. For example, if the switch control unit 34 determines that the switch selector 34 is in the switch position 32a, the switch control unit 35 may cause the provider circuit 17 corresponding to the switch position 32a to provide a controlled current to at least one of the two or more LED packages 18.

If the switch control unit 35 determines that the status of the switch 30 places the LED lamp 10 or LED lighting device 20 in the configurable operating mode, the switch control unit 35 may cause the LED lamp 10 or LED lighting device 20 to be operated at light aspects or qualities indicated by the last received signal from the remote switch 40. For example, the memory element 36 may store an indication of the last received signal from the remote switch 40, a current/most recently used operating color temperature, brightness, and/or CRI indicator, and/or the like such that the LED lamp 10 or the lighting device 20 may be operated at the most recently user-selected light aspects or qualities. In another example, if the switch control unit 35 determines that the status of the switch 30 places the LED lamp 10 or LED lighting device 20 in a programmable custom operating mode, the switch control unit 35 may operate the LED lamp 10 or LED lighting device 20 accordingly (e.g., based on a stored custom operating program stored in memory element 36, and/or the like).

In example embodiments, if the status of the switch 30 corresponds to a set operating mode (e.g., a set operating color temperature, brightness, CRI, and/or the like), the switch controller unit 35 may be bypassed. For example, if the switch selector 34 is in switch position corresponding to a set operating color temperature and/or the like (e.g., 32a, 32b, or 32c), the position of the switch selector 34 may cause the appropriate provider circuit 17 to be activated when the LED lamp 10 or lighting device 20 is turned on. For example, the switch position(s) corresponding to a set operating light aspects or qualities may be in direct electrical communication with the corresponding provider circuit 17 such that placement of the switch selector 34 into that switch position causes the corresponding provider circuit 17 to be completed or activated (e.g., when the LED lamp 10 or lighting device 20 is turned on). Thus, in some example embodiments, the switch control unit 35 may not be powered and/or engaged in the operation of the LED lamp 10 or lighting device 20 unless the status of the switch 30 corresponds to a configurable and/or custom programmable mode. In some embodiments, a set operating mode may set one or more light aspects or qualities, while allowing one or more other light aspects or qualities to be configured. For example, a set operating mode may set the operating color temperature and CRI of the LED lamp 10 or lighting device 20 but allow the brightness to be modified. In another example, a set operating mode may set the operating color and brightness of the LED lamp 10 or lighting device 20 but allow the CRI to be modified. For example, in some example embodiments, if the status of the switch 30 corresponds to a set operating color temperature mode, the switch control unit 35 may only be used to receive and process signals from the remote switch 40 and cause corresponding actions related to turning the LED lamp 10 or lighting device 20 on or off, dimming the LED lamp 10 or lighting device 20, modifying the CRI of the LED lamp 10 or lighting device 20, and/or the like. For example, if the switch control unit 35 receives a signal attempting to change the operating color of the LED lamp 10 or lighting device 20 while the LED lamp 10 or lighting device 20 is in a set operating color temperature mode, the switch control unit 35 need not determine if the LED lamp 10 or lighting device 20 is in a set operating color temperature mode or the configurable operating color temperature mode as the switch control unit 35 cannot affect the circuit connection caused by the position of the switch selector 34.

Example Remote Switch

Example embodiments of the present invention comprise a remote switch 40. In example embodiments, a remote switch 40 may be a wall mounted switch mounted in the same room as the LED lamp 10 or LED lighting device 20 and/or within a short range communication technology range of the LED lamp 10 or LED lighting device 20. For example, the remote switch 40 may be a wall and/or junction box mounted toggle switch, dimmer switch and/or the like in wired communication with the switch control unit 35. In another example, the remote switch 40 may be a handheld device (e.g., a remote control, or computing entity 40') that is within the same room as the LED lamp 10 or LED lighting device 20, within a short range communication technology range of the LED lamp 10 or LED lighting device 20, in communication with the switch control unit 35 through a wireless network, and/or the like. In example embodiments, the remote switch 40 may be in wired or wireless communication with the switch control unit 35. For example, the remote switch 40 may be configured to control the operation of the LED lamp 10 or lighting device 20 or aspects thereof by providing a signal to the switch control unit 35 indicating user selection, interaction, and/or the like with one or more interactive elements of the remote switch 40. For example, the remote switch 40 may be configured to allow a user to toggle through two or more operating color temperatures, brightness, CRIs, and/or other light aspects or qualities of the LED lamp 10 or LED lighting device 20. In example embodiments, the toggling of the remote switch 40 to change or modify the operating light aspects or qualities could be at any time interval from 1 ms to 1 min.

Figure 5:
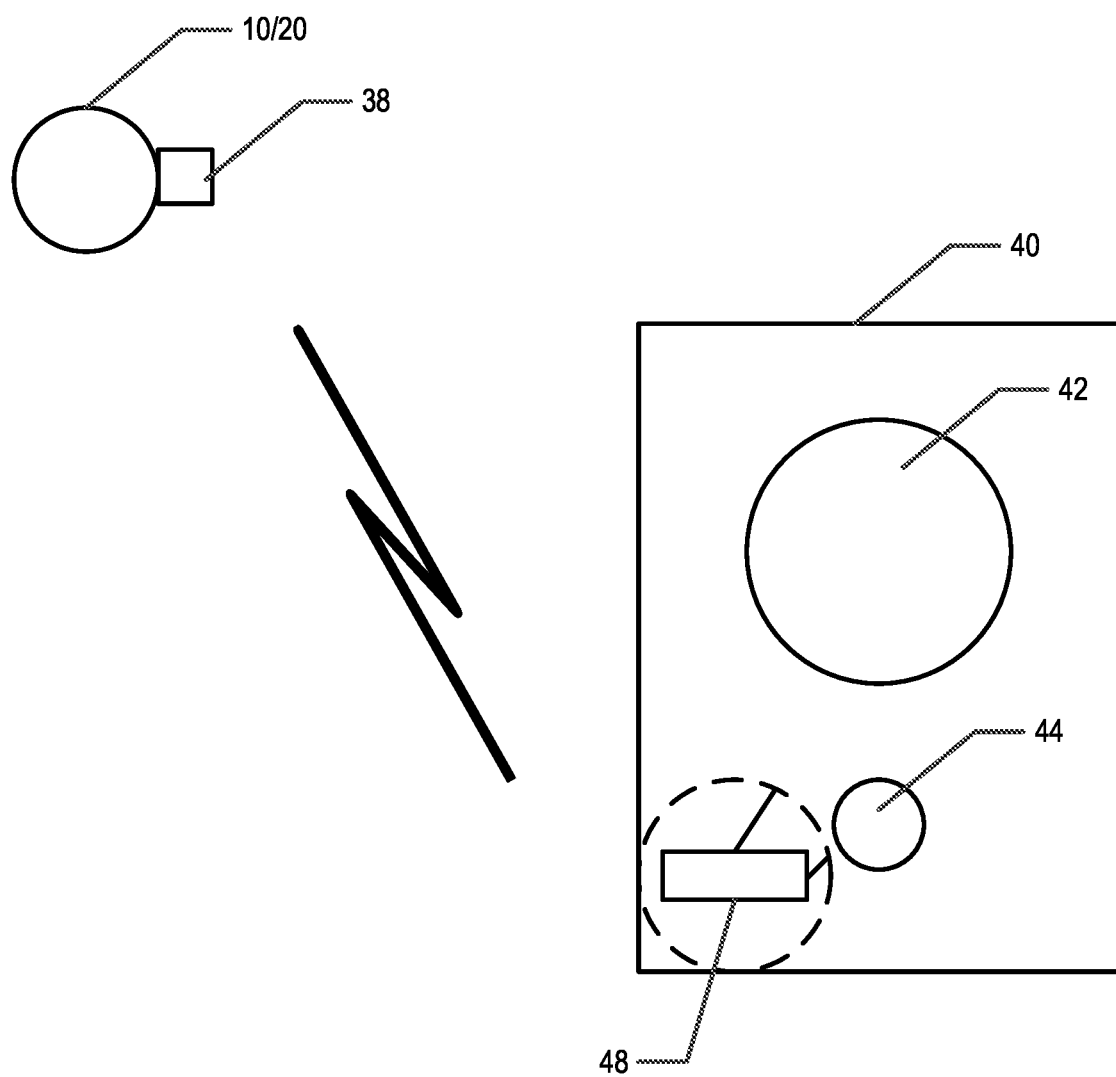
FIG. 5 is a block diagram of a remote switch in communication with an LED lamp or LED lighting device in accordance with example embodiments of the present invention.

For example, the remote switch 40 may be configured to cause the LED lamp 10 or lighting device 20 to turn on or off, control the brightness of the LED lamp 10 or lighting device 20 (e.g., through a dimmer switch), change the operating light aspects or qualities of the LED lamp 10 or lighting device 20, program a programmable custom operating mode, and/or the like. An example remote switch 40 is illustrated in FIG. 5. In example embodiments, the remote switch 40 comprises one or more interactive elements (e.g., 42, 44). For example, the remote switch 40 may comprise an on/off and/or dimmer switch 42 configured to turn the LED lamp 10 (e.g., the lighting device that the LED lamp 10 is secured within) or LED lighting device 20 on or off and/or control the brightness of the LED lamp 10 or the LED lighting device 20. The remote switch 40 may comprise a remote selector 44 (e.g., a color temperature control) configured for remotely selecting an operating color temperature of the LED lamp 10 or lighting device 20 when the LED lamp 10 or LED lighting device 20 is in the configurable operating mode wherein the operating color temperature may be toggled between color temperature A, color temperature B, and color temperature C. For example, a user may select the remote selector 44 to cause the operating color temperature of the LED lamp 10 or lighting device 20 to change from color temperature A to color temperature B, from color temperature B to color temperature C, or from color temperature C to color temperature A. In another example, the remote selector 44 may comprise a button and/or the like for each of the first, second, and third color temperatures and the user may select, press, interact with, and/or the like the button corresponding to the desired color temperatures. In another example, the remote selector 44 may comprise a switch or dial having a switch or dial position corresponding to each of selectable color temperatures. In example embodiments, the remote selector 44 may be a slide, push button, rotary, passive infrared and/or other type of interactive element that the user may interact with, select, press, touch, voice activate, and/or the like. Thus, the remote selector 44 may be configured to allow a user to select a desired operating color temperature, brightness, CRI, and/or other operating light aspects or qualities, and/or a combination thereof during operation of the LED lamp 10 or LED lighting device 20 (e.g., when the LED lamp 10 or LED lighting device 20 is in the configurable operating mode). In example embodiments, the remote switch 40 may comprise additional user interface components as appropriate for the application.

The remote switch 40 may further comprise a communication interface 48. In example embodiments, the communication interface 48 may be a part of a control unit that is similar to the switch control unit 35 (e.g., the control unit may comprise a processing element and/or memory element in addition to the communication interface 48). In example embodiments, the communication interface 48 is configured to provide a signal to the communication interface element 38 indicating user selection and/or interaction with the on/off and/or dimmer switch 42, the remote selector 44, and/or the like.

For example, the communications interface 48 may be configured to communicate with the switch control unit 35. For example, the communications interface 48 may be configured to provide a signal to the communications interface element 38 indicating user selection of, activation of, and/or interaction with an on/off and/or dimmer switch 42, remote selector 44, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the communications interface 48 may be configured to communicate via a wireless communication technology, such as a short range communication technology. For example, the communications interface 48 may be configured to receive and/or send signals using IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Example Computing Device Used as a Remote Switch

Figure 6:
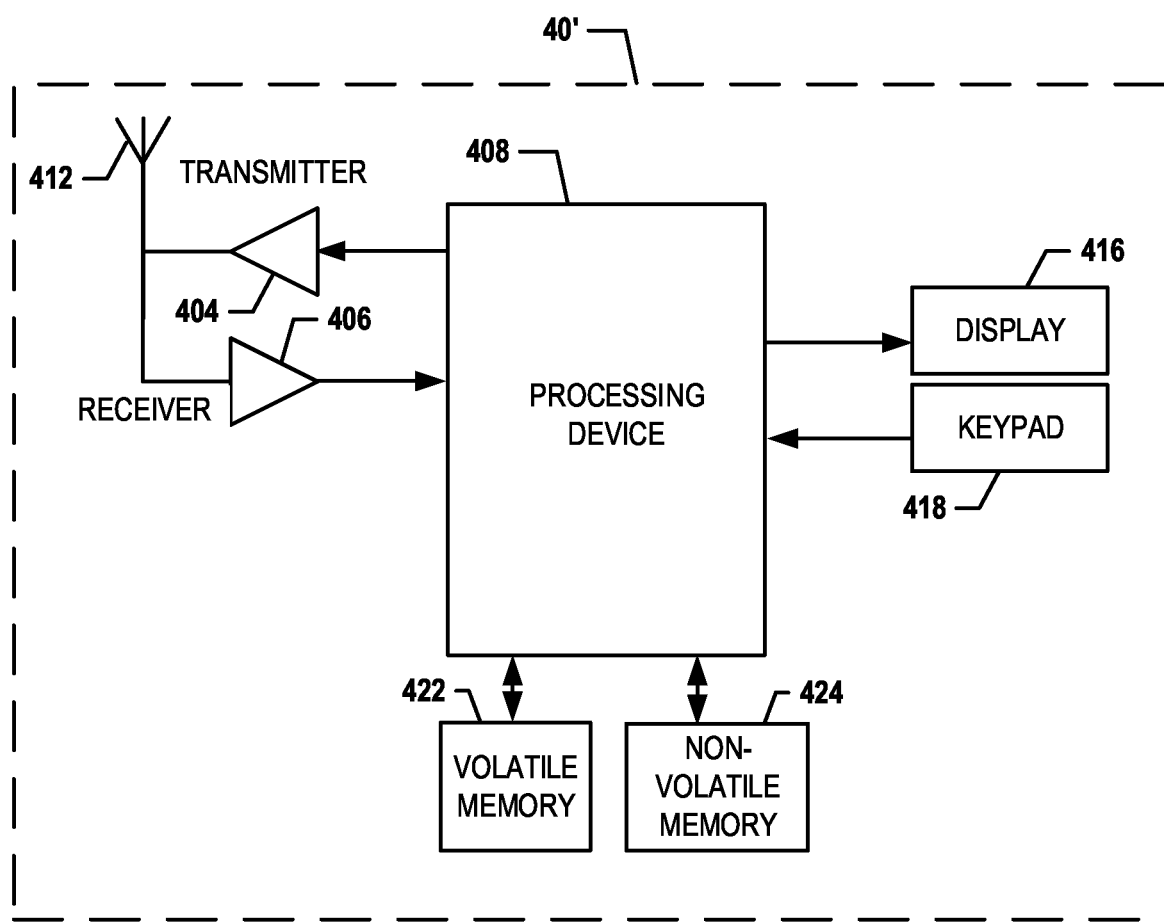
FIG. 6 is a block diagram of a computing entity that may be used as a remote switch in communication with an LED lamp or LED lighting device in accordance with example embodiments of the present invention.

FIG. 6 provides an illustrative schematic representative of a computing entity 40' that can be used in conjunction with embodiments of the present invention. In particular, the computing entity 40' may be configured to operate and/or execute an application configured to cause the computing entity 40' to act as a remote switch 40. For example, the computing entity 40' may operate and/or execute an application configured to communicate with the switch control unit 35 and/or cause one or more aspects (e.g., brightness, CRI, color temperature, and/or the like and/or a combination thereof) of light emitted by the LED lamp 10 or LED lighting device 20 to be modified. In example embodiments, the computing entity 40' may be a mobile computing entity such as a mobile phone, tablet, phablet, wearable computing device, personal digital assistant (PDA), MP3 player, and/or the like.

As shown in FIG. 6, a computing entity 40' can include an antenna 412, a transmitter 404 (e.g., radio), a receiver 406 (e.g., radio), and a processing element 408 that provides signals to and receives signals from the transmitter 404 and receiver 406, respectively. The signals provided to and received from the transmitter 404 and the receiver 406, respectively, may include signaling information/data in accordance with an air interface standard of applicable wireless systems to communicate with various entities, such as switch control unit 35, another computing entity 40', and/or the like. In this regard, the computing entity 40' may be capable of operating with one or more air interface standards, communication protocols, modulation types, and access types. More particularly, the computing entity 40' may operate in accordance with any of a number of wireless communication standards and protocols. In a particular embodiment, the computing device 40' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the computing entity 40' can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 40' can also download changes, add-ons, and updates, for instance, to its firmware, software (e.g., including executable instructions, applications, program modules), and operating system.

According to one embodiment, the computing entity 40' may include location determining aspects, devices, modules, functionalities, and/or similar words used herein interchangeably. For example, the computing entity 40' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 40' position in connection with a variety of other systems, including cellular towers, Wi-Fi access points, and/or the like. Similarly, the computing entity 40' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The computing entity 40' may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the computing entity 40' to interact with and/or cause display of information. The user input interface can comprise any of a number of devices allowing the computing entity 40' to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the computing entity 40' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 40' can collect contextual information/data as part of the telematics data.

The computing entity 40' can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 40'.

Example Method of Operating an LED Lamp or LED Lighting Device

FIG. 7 provides a flowchart illustrating processes and procedures for an example method for operating an LED lamp 10 or LED lighting device 20. Starting at block 102, a user uses the switch 30 to select the preferred operation mode for the LED lamp 10 or LED lighting device 20. For example, the user may place the switch selector 34 in the desired switch position 32 (e.g., 32a, 32b, 32c, 32d). For example, the switch 30 may be used to select one of the set operating modes or the configurable operating mode. In an example embodiment, the switch 30 may be used to select a programmable custom operating mode.

At block 104, the LED lamp 10 or LED lighting device 20 may be installed. For example, the LED lamp 10 may be secured within a socket of a lighting device. In another example, the LED lighting device 20 may be put into electrical connection with line voltage by plugging a two- or three-prong polarized plug into a wall receptacle and the LED lighting device 20 may be placed in a desired position. In another example, the LED lighting device 20 may be electrically connected to line voltage by connecting wires of the LED lighting device 20 to line voltage wires of a junction box and mounting the LED lighting device 20 to a ceiling, wall, and/or the like.

At some time after the LED lamp 10 or LED lighting device 20 is installed, the LED lamp 10 or lighting device 20 is turned on, at block 112. For example, a user may turn on the LED lamp 10 or LED lighting device 20 by interacting with, selecting, pressing, and/or the like an on/off or power button, switch, and/or the like. For example, the user may interact with, select, press, and/or the like the on/off and/or dimmer switch 42 on the remote switch 40, the remote switch 40 may provide an on/off signal to the switch control unit 35, and the switch control unit 35 may cause the LED lamp 10 or LED lighting device 20 to turn on.

At block 114, it may be determined if the LED lamp 10 or LED lighting device 20 is in a set operating mode. For example it may be determined if the switch 30 was set in a position indicating that the LED lamp 10 or LED lighting device 20 is to be operated in a set operating mode (e.g., with set light aspects or qualities). For example, the switch controller unit 35 (e.g., the processing element 37) may determine if the LED lamp 10 or LED lighting device 20 is in a set operating mode. In some embodiments, determining if the LED lamp 10 or LED lighting device 20 is in a set operating mode does not require an active determination. For example, the switch 30 may be wired such that if the switch selector 34 is in set operating mode switch position, the switch control unit 35 may be bypassed and the provider circuit 17 corresponding to the selected set operating light aspects or qualities may be activated, completed, and/or the like causing the LED lamp 10 or LED lighting device 20 to be operated at the set operating light aspects or qualities.

If, at block 114, it is determined that the LED lamp 10 or LED lighting device 20 is in a set operating mode, the LED lamp 10 or LED lighting device 20 is operated at the set operating light aspects or qualities (e.g., color temperature, brightness, CRI, and/or the like), at block 116. For example, the driver circuitry 19 may operate at least one of the two or more LED packages 18 to cause the LED lamp 10 or LED lighting device 20 to emit light at the set operating color temperature.

If, at block 114, it is determined that the LED lamp 10 or LED lighting device 20 is not in a set operating mode, the process continues to block 118. At block 118, the color temperature that the LED lamp 10 or LED lighting device 20 was last operated at is identified. For example, the switch control unit 35 (e.g., the processing element 37, memory element 36, and/or the like) may identify the color temperature, brightness, CRI, and/or the like that the LED lamp 10 or LED lighting device 20 was last operated at. For example, the memory element 36 may store the most recent operating color temperature, brightness, CRI, and/or the like (and/or an indicator thereof), which may be used to identify the light aspects or qualities that the LED lamp 10 or LED lighting device 20 was last operated at. For example, the identified color temperature is applied or implemented as the operating color temperature.

At block 120, the LED lamp 10 or LED lighting device 20 is operated to provide light having the determined or identified light aspects or qualities. For example, the switch control unit 35 may cause the driver circuitry 19 to operate the LED lamp 10 or LED lighting device 20 at the operating light aspects or qualities (e.g., color temperature, brightness, CRI, and/or the like, and/or a combination thereof). For example, the driver circuitry 19 may operate at least one of the two or more LED packages 18 to cause the LED lamp 10 or LED lighting device 20 to emit light at the operating light aspects or qualities. For example, the driver circuitry 19 may operate a specific set of LED packages 18 to cause the LED lamp 10 or LED lighting device 20 to emit light at the operating color temperature (and/or brightness and/or CRI). In another example, the driver circuitry 19 may drive one or more LED packages 18 such that the LED lamp 10 or LED lighting device 20 emits light at the operating color temperature (and/or brightness and/or CRI). In yet another example, the switch control unit 35 may adjust one or more optical elements to cause the LED lamp 10 or LED lighting device 20 to emit light at the operating color temperature (and/or brightness and/or CRI).

At block 122, it is determined if a light aspect or quality change signal is received. For example, the switch control unit 35 may determine if a light aspect or quality change signal is received from the remote switch 40. For example, the signal may indicate user selection of the color selector 44, indicating the user would like to change the operating color temperature of the LED lamp 10 or the LED lighting device 20. For example, it is determined if a light aspect or quality change signal is received by the communication interface element 38. If, at block 122, it is determined that a light aspect or quality change signal is not received, the process returns to block 120.

If, at block 122, it is determined that a light aspect or quality change signal has been received, one or more operating light aspects or qualities of the LED lamp 10 or LED lighting device 20 are modified accordingly. For example, the switch control unit 35 may activate a provider circuit 17 corresponding to the modified operating color temperature (and/or brightness and/or CRI, and/or the like) and may de-activate the previously activated provider circuit 17 corresponding to the previous operating color temperature (and/or brightness and/or CRI, and/or the like). For example, the switch control unit 35 may cause one provider circuit 17 to provide a controlled electric current to the corresponding at least one LED package 18 such that the LED lamp 10 or LED lighting device 20 emits light having the modified operating light aspects or qualities and cause another provider circuit 17 to stop providing an electric current to the corresponding at least one LED package 18 corresponding to the previous operating light aspect or qualities. For example, the memory element 36 may be updated to indicate the new most recent operating light aspects or qualities. In example embodiments, the switch control unit 35 and/or driver circuitry 19 are configured to start operating the at least one of the two or more LED packages 18 at the modified operating light aspects or qualities within two seconds or less of the receipt of the signal indicating user-selection of the modified operating light aspects or qualities. After the one or more operating light aspects or qualities are modified, the process returns to block 120.

Alternative Example Method of Operating an LED Lamp or LED Lighting Device

FIG. 8 provides a flowchart illustrating processes and procedures for an alternative method for operating an LED lamp 10 or LED lighting device 20. Starting at block 202, a user uses the switch 30 to select the preferred operation mode for the LED lamp 10 or LED lighting device 20. For example, the user may place the switch selector 34 in the desired switch position 32 (e.g., 32a, 32b, 32c, 32d). For example, the switch 30 may be used to select one of the set operating modes or the configurable operating mode. In an example embodiment, the switch 30 may be used to select a programmable custom operating mode.

At block 204, the LED lamp 10 or LED lighting device 20 may be installed. For example, the LED lamp 10 may be secured within a socket of a lighting device. In another example, the LED lighting device 20 may be put into electrical connection with line voltage by plugging a two- or three-prong polarized plug into a wall receptacle and the LED lighting device 20 may be placed in a desired position. In another example, the LED lighting device 20 may be electrically connected to line voltage by connecting wires of the LED lighting device 20 to line voltage wires of a junction box and mounting the LED lighting device 20 to a ceiling, wall, and/or the like. In yet another example, a wiring harness terminating in a standard size lamp base connector may be secured into the socket of a recessed lighting fixture. The LED lighting device 20 may then be placed, mounted, installed, and/or the like in a desired position.

At some time after the LED lamp 10 or LED lighting device 20 is installed, the LED lamp 10 or lighting device 20 is turned on, at block 212. For example, a user may turn on the LED lamp 10 or lighting device 20 by interacting with, selecting, pressing, and/or the like an on/off or power button, switch, and/or the like. For example, the user may interact with, select, press, and/or the like the on/off and/or dimmer switch 42 on the remote switch 40, the remote switch 40 may provide an on/off signal to the switch control unit 35, and the switch control unit 35 may cause the LED lamp 10 or LED lighting device 20 to turn on.

At block 214, the color temperature that the LED lamp 10 or LED lighting device 20 was last operated at is identified. For example, the switch control unit 35 (e.g., the processing element 37, memory element 36, and/or the like) may identify the color temperature that the LED lamp 10 or LED lighting device 20 was last operated at. For example, the memory element 36 may store the most recent operating light aspects or qualities, which may be used to identify the color temperature, brightness, CRI, and/or the like that the LED lamp 10 or LED lighting device 20 was last operated at. For example, the identified light aspects or qualities are applied or implemented as the operating light aspects or qualities.

At block 216, the LED lamp 10 or LED lighting device 20 is operated at the operating light aspects or qualities. For example, the switch control unit 35 may cause the driver circuitry 19 to operate the LED lamp 10 or LED lighting device 20 at the operating light aspects or qualities (e.g., color temperature, brightness, CRI, and/or the like). For example, the driver circuitry 19 may operate at least one of the two or more LED packages 18 to cause the LED lamp 10 or LED lighting device 20 to emit light at the operating color temperature. For example, the driver circuitry 19 may operate a specific set of LED packages 18 to cause the LED lamp 10 or LED lighting device 20 to emit light at the operating color temperature (and/or brightness and/or CRI). In another example, the driver circuitry 19 may drive one or more LED packages 18 such that the LED lamp 10 or LED lighting device 20 emits light at the operating color temperature (and/or brightness and/or CRI). In yet another example, the switch control unit 35 may adjust one or more optical elements to cause the LED lamp 10 or LED lighting device 20 to emit light at the operating color temperature (and/or brightness and/or CRI and/or the like).

At block 218, it is determined if a light aspect or quality change signal is received. For example, the switch control unit 35 may determine if a light aspect or quality change signal is received from the remote switch 40. For example, the signal may indicate user selection of the color selector 44, indicating the user would like to change one or more operating light aspects or qualities of the LED lamp 10 or the LED lighting device 20. In another example, the signal may indicate user selection of the dimmer switch 42, indicating the user would like to change the brightness of the light emitted by the LED lamp 10 or the LED lighting device 20. For example, it is determined if a light aspect or quality change signal is received by the communication interface element 38. If, at block 218, it is determined that a light aspect or quality change signal is not received, the process returns to block 216.

If, at block 218, it is determined that a light aspect or quality change signal has been received, it determined if the LED lamp 10 or LED lighting device 20 is in a set operating mode, at block 220. For example it may be determined if the switch 30 was set in a position indicating that the LED lamp 10 or LED lighting device 20 is to be operated in a set operating mode. For example, the switch control unit 35 (e.g., processing elements 37) may determine if the LED lamp 10 or LED lighting device 20 is to be operated in a set operating mode. In some embodiments, determining if the LED lamp 10 or LED lighting device 20 is in a set operating mode does not require an active determination. For example, the switch 30 may be wired such that if the switch selector 34 is in set operating mode switch position, the switch control unit 35 may be bypassed and the provider circuit 17 corresponding to the selected set operating mode (e.g., a set operating color temperature) may be activated, completed, and/or the like causing the LED lamp 10 or LED lighting device 20 to be operated at the set operating light aspects or qualities.

If, at block 220, it is determined that the LED lamp 10 or LED lighting device 20 is in a set operating mode, the process returns to block 216 without modifying the operating light aspects or qualities. If, at block 220, it is determined that the LED lamp 10 or LED lighting device 20 is not in a set operating mode, the process continues to block 222.

At block 222, the operating light aspects or qualities of the LED lamp 10 or LED lighting device 20 are modified in accordance with the received light aspect or quality change signal. For example, the switch control unit 35 may activate a provider circuit 17 corresponding to a modified operating color temperature and may de-activate the previously activated provider circuit 17 corresponding to the previous operating color temperature. For example, the switch control unit 35 may cause one provider circuit 17 to provide a controlled electric current to the corresponding at least one LED package 18 such that the LED lamp 10 or LED lighting device 20 emits light at the modified operating color temperature (and possibly at a modified brightness and/or CRI) and cause another provider circuit 17 to stop providing an electric current to the corresponding at least one LED package 18. For example, the memory element 36 may be updated to indicate the new most recent operating light aspects or qualities. In example embodiments, the switch control unit 35 and/or driver circuitry 19 are configured to start operating the at least one of the two or more LED packages 18 at the modified operating light aspects or qualities within two seconds or less of the receipt of the signal indicating user-selection of the second operating light aspects or qualities. After the operating light aspects or qualities are modified, the process returns to block 216.

In example embodiments, an LED lamp 10 or LED lighting device 20 may be configured to provide a programmable custom operating mode. For example, a user may select a custom operating color temperature (and/or brightness and/or CRI and/or the like) and/or program the LED lamp 10 or LED lighting device 20 (e.g., the switch control unit 35 thereof) to operate the LED lamp 10 or LED light device 20 in accordance with a custom programmed temporal operating program. For example, with reference to FIG. 8, at block 202, the switch 30 of the LED lamp 10 or the LED lighting device 20 may be placed in a position corresponding to a programmable custom operating mode. The user may further program the programmable custom operating mode (e.g., using the switch 30, additional user interface components, remote switch 40, and/or the like). In an example embodiment, programming programmable custom operating mode may comprise providing input identifying a custom operating color, selecting a brightness, selecting a CRI, and/or the like. For example, the LED lamp 10 or LED lighting device 20 may comprise first LED packages 18*a* and second LED packages 18*b*, wherein the first LED packages 18*a* are configured to emit light of a different color temperature than the second LED packages 18*b*. The switch control unit 35 may be configured to determine a ratio of the number of first LED packages 18*a* to the number of second LED packages 18*b* that should be activated to provide the custom operating color temperature. For example, the first LED packages 18*a* may be configured to emit light at 3000K and the second LED packages 18*b* may be configured to emit light at 5000k. The programmable custom operating color temperature may be programmed to be 4500K. In this example, the switch control unit 35 may be configured to determine that one-fourth of the first LED packages 18*a* and three-fourths of the second LED packages 18*b* should be activated to provide a light at a color temperature of 4500K. The switch control unit 35 may then be configured to activate one or more provider circuits 17 in order to activate the appropriate LED packages 18 when the LED lamp 10 or LED lighting device 20 is turned on to provide light of the programmed custom operating color temperature. In another example, the switch control unit 35 may determine how one or more LED packages 18 should be driven to provide light having the user-selected light aspects or qualities. In another example, the switch control unit 35 may cause the primary or secondary optics, the amount of phosphor conditioning light from one or more LED packages 18, and/or the like to be modified such that the LED lamp 10 or LED lighting device 20 emits light having the user-selected light aspects or qualities. At block 204, the LED lamp 10 or LED lighting device 20 may be installed.

At some time after the LED lamp 10 or LED lighting device 20 is installed, the LED lamp 10 or lighting device 20 is turned on, at block 212. For example, a user may turn on the LED lamp 10 or lighting device 20 by interacting with, selecting, pressing, and/or the like an on/off or power button, switch, and/or the like. For example, the user may interact with, select, press, and/or the like the on/off and/or dimmer switch 42 on the remote switch 40, the remote switch 40 may provide an on/off signal to the switch control unit 35, and the switch control unit 35 may cause the LED lamp 10 or LED lighting device 20 to turn on.

At block 214, the light aspects or qualities (e.g., color temperature, brightness, CRI, and/or the like) that the LED lamp 10 or LED lighting device 20 are to be operated at may be identified. For example, the color temperature the LED lamp 10 or LED lighting device 20 was last operated at may be identified. In another example, the memory element 36 may be accessed (e.g., by the processing element 37) to identify the appropriate operating light aspects or qualities based on the programmed custom operating mode, the time of day, and/or the like. If the LED lamp 10 or LED lighting device 20 is in a programmable custom operating mode in which a custom operating color temperature has been programmed, the switch control unit 35 may determine the appropriate combination of LED packages 18 to be activated to provide light of the custom operating color temperature and the corresponding provider circuits 17 that are to be activated, the current at which the provider corresponding provider circuits 17 are to be activated with, and/or the like.

At block 216, the LED lamp 10 or LED lighting device 20 is operated at the identified operating light aspects or qualities. For example, the switch control unit 35 may cause the driver circuitry 19 to operate the LED lamp 10 or LED lighting device 20 at the operating light aspects or qualities. For example, the driver circuitry 19 may operate at least one of the two or more LED packages 18 to cause the LED lamp 10 or LED lighting device 20 to emit light at the identified operating color temperature. For example, the appropriate provider circuits for providing the identified operating color temperature are activated such that the LED lamp 10 or LED lighting device 20 provides light of the user-selected operating color temperature. For example, the driver circuitry 19 may drive one or more LED packages 18 to provide light having the identified light aspects or qualities.

At block 218, it is determined if a light aspect or quality change signal is received. If a light aspect or quality change signal has not been received (e.g., as determined by the switch control unit 35), the process returns to block 216. If a light aspect or quality change signal is received, the process continues to step 220, wherein it is determined if the LED lamp 10 or LED lighting device 20 is in a set operating mode. In some embodiments, the programmable custom operating mode may be a set mode, wherein the operating color temperature (and/or other light aspects or qualities) of the LED lamp 10 or LED lighting device 20 cannot be modified during operation of the LED lamp 10 or LED lighting device 20. In some example embodiments, the programmable custom operating mode may be a selectively configurable mode, wherein the operating color temperature (or other light aspect or quality) of the LED lamp 10 or LED lighting device 20 may be modified during operation of the LED lamp 10 or LED lighting device 20. For example, the operating color temperature of the LED lamp 10 or LED lighting device 20 may be switched between one or more predefined color temperatures (e.g., the first, second, and third color temperatures) and the programmed custom operating color temperature (and/or brightness and/or CRI and/or the like). Thus, the switch control unit 35 may determine (e.g., based on the status of the switch 30 and/or one or more programs and/or the like stored by the memory element 36) if the LED lamp 10 or LED lighting device 20 is in a set mode or a configurable mode.

If it is determined that the LED lamp 10 or LED lighting device 20 is in a set mode, the process returns to block 216, and the LED lamp 10 or LED lighting device 20 continues to provide light at the operating light aspects or qualities. If it is determined that the LED lamp 10 or LED lighting device 20 is in a configurable mode, the process continues to block 222. At block 222, the operating light aspects or qualities are modified in accordance with the received light aspect or quality change signal. The process then returns to block 216.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An LED lighting device or LED lamp comprising:
   four or more LED packages, one of the four or more LED packages and another of the four or more LED packages, the one of the four or more LED packages being exclusive of the another of the two or more LED packages;
   a selectable first fixed operating mode having first fixed operating light characteristics; and
   a selectable second fixed operating mode having second fixed operating light characteristics different from the first fixed operating light characteristics,
   wherein at least one of the first fixed operating light characteristics or the second fixed operating light characteristics is provided by activation of a combination of: (a) less than all of the four or more LED packages, (b) the one of the four or more LED packages, and (c) the another of the four or more LED packages.

2. The LED lighting device or LED lamp of claim 1, wherein the first and second fixed operating modes are represented by a switch-based indicator, such that the first and second fixed operating modes are two physical positions of the switch.

3. The LED lighting device or LED lamp of claim 1, wherein the operating light qualities further include one or more of brightness or color rendering index (CRI).

4. The LED lighting device or LED lamp of claim 1, wherein at least one of the first fixed operating light characteristics are a first color temperature or the second fixed operating light characteristics are a second color temperature.

5. The LED lighting device or LED lamp of claim 1, further comprising a control unit comprising (a) a memory element and (b) a processor element, the memory element configured to store information identifying the operating light qualities the LED lighting device or LED lamp was most recently operated at and the processor element configured to identify the operating light qualities corresponding to a most recently received user-selection of the operating light qualities.

6. The LED lighting device or LED lamp of claim 5, wherein the driver circuitry is configured to start operating the plurality of LED packages at the modified light qualities within two seconds of the receipt of the user-selection of the modified light qualities.

7. The LED lighting device or LED lamp of claim 1, wherein:
   the device or lamp further comprises an indicator representative of a configurable operating mode;
   when the indicator is in the configurable operating mode, responsive to receiving an indication of user input for selecting custom operating light qualities other than those associated with the first and second operating modes, operation of the plurality of LED packages is modified in accordance with the custom operating light qualities.

8. The LED lighting device or LED lamp of claim 7, further comprising driver circuitry, wherein when the indicator is in the configurable operating mode, the lighting device or LED lamp is configured to receive a user-selection of modified operating light qualities, wherein the modified operating light qualities are different from the operating light qualities corresponding to both the first and the second operating light qualities by at least one of brightness, color temperature, or color rendering index (CRI), and wherein when the indicator is in the configurable operating mode, the driver circuitry is configured to modify the operation of the plurality of LED packages from providing light having the operating light qualities to providing light having the modified light qualities.

9. The LED lighting device or LED lamp of claim 1, wherein an indicator represents the first and second fixed operating modes and further comprises at least one selectable option corresponding to a programmable custom operating mode.

10. An LED lighting device or LED lamp comprising:
    a plurality of LED packages, a first set of the plurality of LED packages being configured to, in response to receiving a signal indicating a user-selection provided via a remote device, emit light having a first light characteristic and a second set of the plurality of LED packages being configured to, in response to receiving a signal indicating a user-selection provided via the remote device, emit light having a second light characteristic, the first set of the plurality of LED packages being mutually exclusive of the second set of the plurality of LED packages; and a selectable first fixed operating mode having a first operating light characteristic and a selectable second operating mode having a second operating light characteristic different from the first operating light characteristic;

wherein, when the LED lighting device or LED lamp is on, at least one of the first operating light characteristic or the second operating light characteristic is provided by activation of a combination of: (a) at least one and less than all of the first set of the plurality of LED packages and (b) at least one and less than all of the second set of the plurality of LED packages.

11. The LED lighting device or LED lamp of claim 10, wherein the operating light qualities further include one or more of brightness, color temperature, or color rendering index (CRI).

12. The LED lighting device or LED lamp of claim 10, further comprising a control unit comprising (a) a memory element and (b) a processor element, the memory element configured to store information identifying the operating light qualities the LED lighting device or LED lamp was most recently operated at and the processor element configured to identify the operating light qualities corresponding to a most recently received signal indicating user-selection of the operating light qualities.

13. The LED lighting device or LED lamp of claim 10, further comprising a configurable operating mode wherein the lighting device or LED lamp is configured to receive a signal indicating user-selection of modified light qualities, wherein the modified operating light qualities are different from the operating light qualities of the first and second fixed operating modes by at least one of brightness, color temperature, or color rendering index (CRI), and operation of the plurality of LED packages is modified from providing light having the operating light qualities of the first or the second fixed operating modes to providing light having the modified light qualities.

14. The LED lighting device or LED lamp of claim 10, wherein the signal indicating user-selection of the modified light qualities is received through a toggle input device.

15. A device comprising:
a plurality of LED packages, a first set of the plurality of LED packages being configured to emit light at a first light characteristic and a second set of the plurality of LED packages being configured to emit light at a second light characteristic different from the first light characteristic;

a first fixed operating mode having a first operating light characteristic; and second fixed operating mode having a second operating light characteristic;

wherein, in either of the first or second fixed operating light modes a combination of: (a) at least one and less than all of the first set of the plurality of LED packages and (b) at least one and less than all of the second set of the plurality of LED packages is activated.

16. The device of claim 15, further comprising a portable remote device that is one of a remote control or a mobile computing entity operating an application configured to cause a mobile computing entity to act as a remote switch for selection of the first or second fixed operating modes.

17. The device of claim 15, further comprising a configurable operating mode, wherein when an indicator is in the configurable operating mode, the device is configured to receive a signal from a remote device indicating user-selection of modified light qualities, wherein the modified operating light qualities are different from the operating light qualities of the first and second fixed operating modes by at least one of brightness, color temperature, or color rendering index (CRI), and the operation of the plurality of LED packages is modified from providing light having the operating light qualities of the first or the second fixed operating modes to providing light having the modified light qualities.

18. The device of claim 15, further comprising a control unit comprising a communication interface element configured to receive a signal indicating a user-selection, the user selection provided through user interaction with a remote device.

19. The device of claim 18, wherein the communication interface element is configured to receive the signal by at least one of a short-range communication technology or a wireless communication technology.

20. The device of claim 15, further comprising a control unit comprising (a) a memory element and (b) a processing element, the memory element being configured to store information identifying the operating light qualities the LED lighting device or LED lamp was most recently operated at and the processor element being configured to identify the operating light qualities corresponding to a most recently received signal indicating user-selection of the operating light qualities.

* * * * *